(12) United States Patent
Toll et al.

(10) Patent No.: US 10,372,449 B2
(45) Date of Patent: *Aug. 6, 2019

(54) PACKED DATA OPERATION MASK CONCATENATION PROCESSORS, METHODS, SYSTEMS, AND INSTRUCTIONS

(71) Applicant: Intel Corporation, Santa Clara, CA (US)

(72) Inventors: Bret L. Toll, Hillsboro, OR (US);
Robert Valentine, Kiryat Tivon (IL);
Jesus Corbal San Andrian, Barcelona (ES); Elmoustapha Ould-Ahmed-Vall, Chandler, AZ (US); Mark J. Charney, Lexington, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/442,823

(22) Filed: Feb. 27, 2017

(65) Prior Publication Data
US 2017/0300327 A1    Oct. 19, 2017

Related U.S. Application Data

(63) Continuation of application No. 13/977,239, filed as application No. PCT/US2011/066849 on Dec. 22, 2011, now Pat. No. 9,600,285.

(51) Int. Cl.
*G06F 15/00*    (2006.01)
*G06F 15/76*    (2006.01)
*G06F 9/30*    (2018.01)

(52) U.S. Cl.
CPC ...... *G06F 9/30036* (2013.01); *G06F 9/30018* (2013.01); *G06F 9/30101* (2013.01); *G06F 9/30181* (2013.01)

(58) Field of Classification Search
CPC .... G06F 9/3017; G06F 13/14; G06F 9/30036; G06F 9/3013; G06F 9/30018; G06F 9/30032
(Continued)

(56) References Cited

U.S. PATENT DOCUMENTS 5,802,336 A    9/1998    Peleg et al.
6,906,936 B1    6/2005    James et al.
(Continued)

FOREIGN PATENT DOCUMENTS

CN    1180427 A    4/1998
CN    1492315 A    4/2004
(Continued)

OTHER PUBLICATIONS

Notice of Allowance received for Taiwan Patent Application No. 101147505, dated Aug. 26, 2015, 2 pages of Taiwan Notice of Allowance Only.
(Continued)

*Primary Examiner* — Chun Kuan Lee
(74) *Attorney, Agent, or Firm* — NDWE, LLP

(57) ABSTRACT

A method of an aspect includes receiving a packed data operation mask concatenation instruction. The packed data operation mask concatenation instruction indicates a first source having a first packed data operation mask, indicates a second source having a second packed data operation mask, and indicates a destination. A result is stored in the destination in response to the packed data operation mask concatenation instruction. The result includes the first packed data operation mask concatenated with the second packed data operation mask. Other methods, apparatus, systems, and instructions are disclosed.

21 Claims, 22 Drawing Sheets

(58) Field of Classification Search
USPC .......................................................... 712/5
See application file for complete search history.

(56) References Cited

U.S. PATENT DOCUMENTS

| 7,631,025 | B2 | 12/2009 | Debes et al. |
| 2004/0054878 | A1 | 3/2004 | Debes et al. |
| 2006/0010255 | A1 | 1/2006 | Van Berkel et al. |
| 2006/0236076 | A1 | 10/2006 | Peleg et al. |
| 2008/0215855 | A1 | 9/2008 | Abdallah et al. |
| 2009/0172358 | A1 | 7/2009 | Sperber et al. |
| 2011/0093682 | A1 | 4/2011 | Peleg et al. |

FOREIGN PATENT DOCUMENTS

| CN | 101097512 A | 1/2008 |
| CN | 101211255 A | 7/2008 |
| CN | 103460182 A | 12/2013 |
| TW | 200537879 A | 11/2005 |
| TW | 200623765 A | 7/2006 |
| WO | 2012134560 A1 | 10/2012 |
| WO | 2013/095510 A1 | 6/2013 |

OTHER PUBLICATIONS

Office Action and Search Report received for Taiwan Patent Application No. 101147505, dated Oct. 30, 2014, 5 pages of Taiwan Office Action Only.
Final Office Action received for U.S. Appl. No. 13/977,239, dated Jun. 8, 2016, 8 Pages.
Non-Final Office Action received for U.S. Appl. No. 13/977,239, dated Nov. 13, 2015, 12 pages.
Notice of Allowance received for U.S. Appl. No. 13/977,239, dated Nov. 4, 2016, 7 pages.
Supplemental Notice of Allowance received for U.S. Appl. No. 13/977,239, dated Dec. 13, 2016, 5 pages.
Office Action and Search Report received for Chinese Patent Application No. 201180075847.0, dated Dec. 3, 2015, 11 pages of Chinese Office Action including 6 pages of English Translation.
Office Action received for Chinese Patent Application No. 201180075847.0, dated Sep. 26, 2016, 23 pages of Chinese Office Action including 9 pages of English Translation.
International Preliminary Report on Patentability and Written Opinion received for PCT Application No. PCT/US2011/066849 dated Jul. 3, 2014, 6 pages.
International Search Report and Written Opinion reeived for PCT Patent Application No. PCT/US2011/066849, dated Aug. 17, 2012, 11 Pages.
Intel, "Intel 64 and IA-32 Architectures Software Developer's Manual", Oct. 2011, 526 pages.
Intel, "Intel 64 and IA-32 Architectures Software Developer's Manual", Instruction Set Reference, A-M, vol. 2A, order No. 253666-039US, May 2011, 832 pages.
Intel, "Intel Advanced Vector Extensions Programming Reference", Jun. 2011, 595 pages.
Intel, "Intel 64 and IA-32 Architectures Software Developer's Manual", vol. 1: Basic Architecture, Order Number: 253665-040US, Oct. 2011, 548 pages.
Intel, "Intel 64 and IA-32 Architectures Software Developer's Manual", vol. 2 (2A, B & 2C): Instruction Set Reference, A-Z, Order No. 325383-040US, Oct. 2011, 1721 pages.
Intel, "Intel 64 and IA-32 Architectures Software Developer's Manual", vol. 3 (3A, 3B & 3C): System Programming Guide, Order No. 325384-040US, Oct. 2011, 1916 pages.
Office Action received for Chinese Patent Application No. 201180075847.0, dated Jun. 12, 2017, 15 pages of Chinese Office Action including 9 pages of English Translation.
First Office Action and Search Report from foreign counterpart Chinese Patent Application No. 201610875222.7, dated Apr. 3, 2018, 15 pages.
Griffith A., "GCC: The Complete reference," McGraw-Hill companies, Jul. 31, 2004, pp. 388-391 and 409-411.

NUMBER OF PACKED DATA
OPERATION MASK BITS
923

| DATA ELEMENT WIDTH | PACKED DATA WIDTH | | |
|---|---|---|---|
| | 128 BITS | 256 BITS | 512 BITS |
| 8-BIT BYTES | 16 | 32 | 64 |
| 16-BIT WORDS | 8 | 16 | 32 |
| 32-BIT DWORDS/SP | 4 | 8 | 16 |
| 64-BIT QWORDS/DP | 2 | 4 | 8 |

KCONCATBW DEST, SRC1, SRC2

DEST[7:0] ← SRC1[7:0]

DEST[15:8] ← SRC2[7:0]

DEST[MAX_KL-1:16] ← 0

CONCATENATE LOWER ORDER 8-BITS OF SRC1 AND SRC2
INTO LOWER ORDER 16-BITS OF DEST.
ZERO HIGHER ORDER REMAINDER OF DEST

*FIG. 12A*

KCONCATWD DEST, SRC1, SRC2

DEST[15:0] ← SRC1[15:0]

DEST[31:16] ← SRC2[15:0]

DEST[MAX_KL-1:32] ← 0

CONCATENATE LOWER ORDER 16-BITS OF SRC1 AND SRC2
INTO LOWER ORDER 32-BITS OF DEST.
ZERO HIGHER ORDER REMAINDER OF DEST

*FIG. 12B*

KCONCATDQ DEST, SRC1, SRC2

DEST[31:0] ← SRC1[31:0]

DEST[63:32] ← SRC2[31:0]

DEST[MAX_KL-1:64] ← 0

CONCATENATE LOWER ORDER 32-BITS OF SRC1 AND SRC2
INTO LOWER ORDER 64-BITS OF DEST.
ZERO HIGHER ORDER REMAINDER OF DEST (IF ANY)

*FIG. 12C*

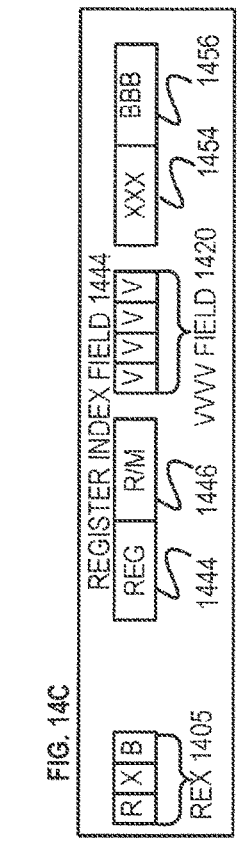
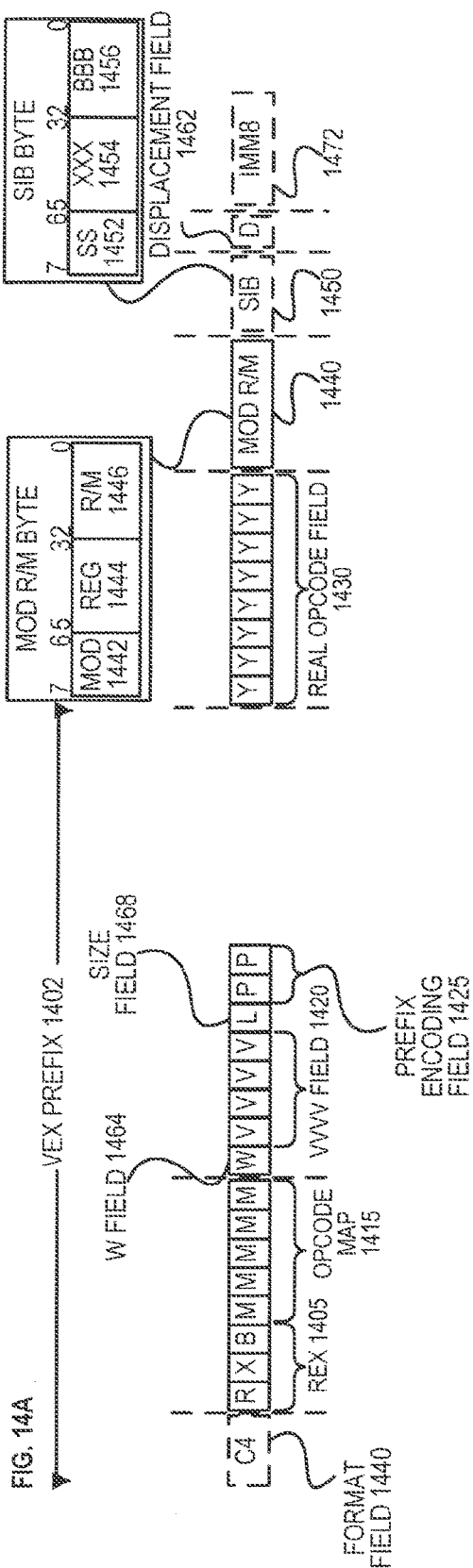
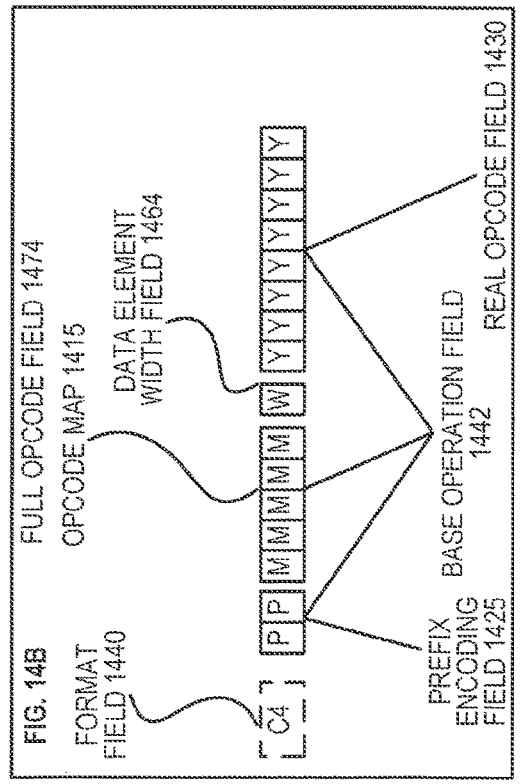
FIG. 14A
FIG. 14B
FIG. 14C

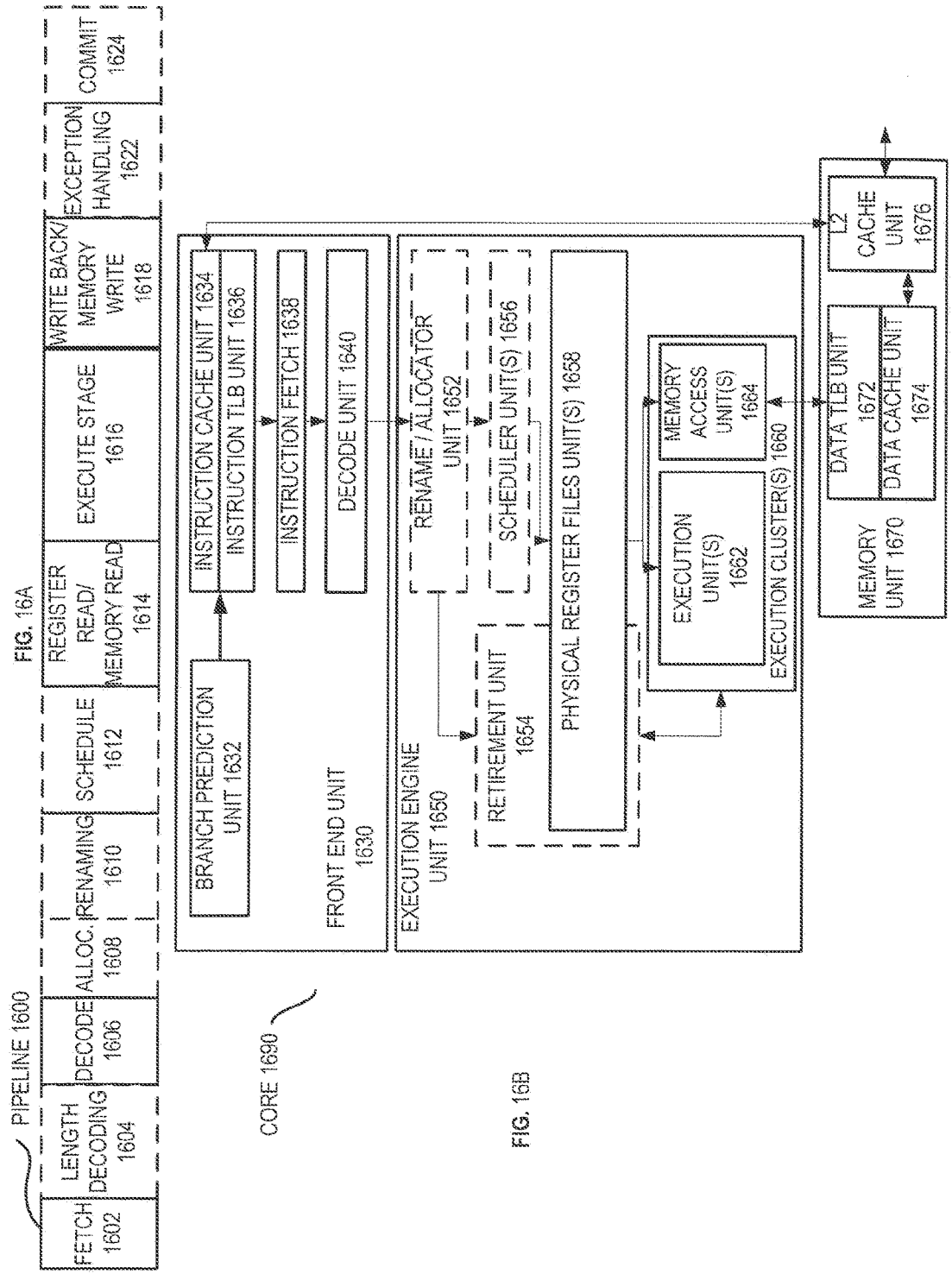

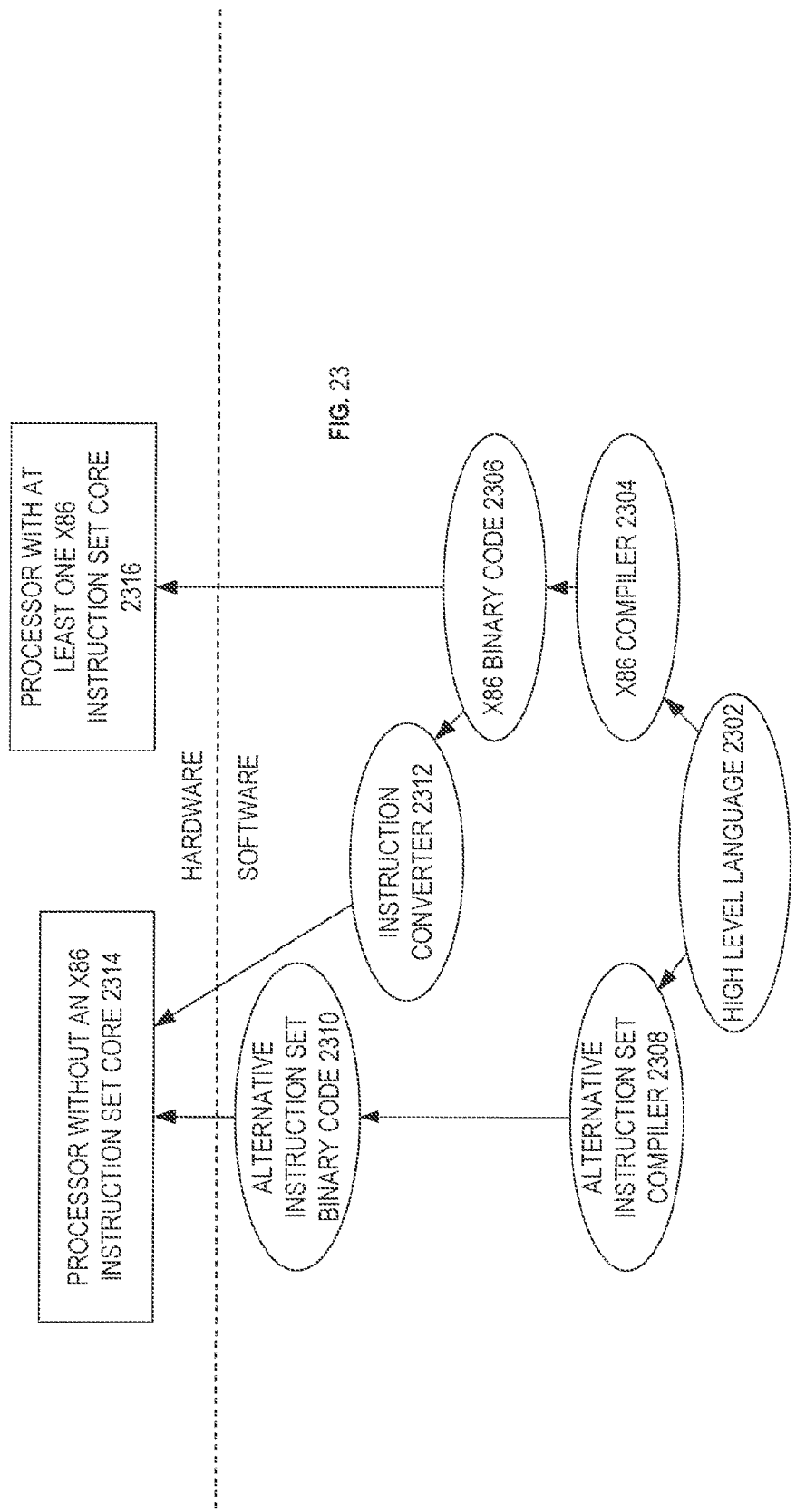

PACKED DATA OPERATION MASK CONCATENATION PROCESSORS, METHODS, SYSTEMS, AND INSTRUCTIONS

RELATED APPLICATIONS

The present application is a continuation of U.S. patent application Ser. No. 13/977,239, filed on Jun. 28, 2013, entitled "PACKED DATA OPERATION MASK CONCATENATION PROCESSORS, METHODS, SYSTEMS, AND INSTRUCTIONS", which is a U.S. National Phase Application under 35 U.S.C. Section 371 of International Application No. PCT/US2011/066849, filed on Dec. 22, 2011, entitled "PACKED DATA OPERATION MASK CONCATENATION PROCESSORS, METHODS, SYSTEMS, AND INSTRUCTIONS", which is hereby incorporated herein by reference in its entirety and for all purposes.

BACKGROUND

Field

Embodiments relate to processors. In particular, embodiments relate to processors to concatenate packed data operation masks responsive to packed data operation mask concatenation instructions.

Background Information

Many processors have Single Instruction, Multiple Data (SIMD) architectures. The SIMD architectures generally help to significantly improve processing speed. In SIMD architectures, instead of a scalar instruction operating on only one data element or pair of data elements, a packed data instruction, vector instruction, or SIMD instruction may operate on multiple data elements or multiple pairs of data elements simultaneously or in parallel. The processor may have parallel execution hardware responsive to the packed data instruction to perform the multiple operations simultaneously or in parallel.

In SIMD architectures multiple data elements may be packed within one register or memory location as packed data or vector data. In packed data, the bits of the register or other storage location may be logically divided into a sequence of multiple fixed-sized data elements. Each of the data elements may represent an individual piece of data that is stored in the register or storage location along with other data elements typically having the same size. For example, a 256-bit wide register may have four 64-bit wide packed data elements, eight 32-bit wide packed data elements, sixteen 16-bit wide packed data elements, or thirty-two 8-bit wide packed data elements. Each of the packed data elements may represent a separate individual piece of data (e.g., a color of a pixel, etc.) that may be operated upon separately or independently of the others.

Representatively, one type of packed data instruction, vector instruction, or SIMD instruction (e.g., a packed add instruction) may specify that a single packed data operation (e.g., addition) be performed on all corresponding pairs of data elements from two source packed data operands in a vertical fashion to generate a destination or result packed data. The source packed data operands may be of the same size, may contain data elements of the same width, and thus may each contain the same number of data elements. The source data elements in the same bit positions in the two source packed data operands may represent pairs of corresponding data elements. The packed data operation may be performed separately or independently on each of these pairs of corresponding source data elements to generate a matching number of result data elements, and thus each pair of corresponding source data elements may have a corresponding result data element. Typically, the result data elements for such an instruction are in the same order and they often have the same size.

In addition to this exemplary type of packed data instruction, there are a variety of other types of packed data instructions. For example, there are those that have only one, or more than two, source packed data operands, those that operate in a horizontal fashion instead of a vertical fashion, those that generate a result packed data operand of a different size, those that have different sized data elements, and/or those that have a different data element order.

BRIEF DESCRIPTION OF THE SEVERAL VIEWS OF THE DRAWINGS

The invention may best be understood by referring to the following description and accompanying drawings that are used to illustrate embodiments of the invention. In the drawings:

FIGS. 12A-12C illustrate various particular example embodiments of packed data operation mask concatenation instructions and operations thereof.

FIG. 14A illustrates an exemplary AVX instruction format including a VEX prefix, real opcode field, Mod R/M byte, SIB byte, displacement field, and IMM8.

FIG. 14B illustrates which fields from FIG. 14A make up a full opcode field and a base operation field.

FIG. 14C illustrates which fields from FIG. 14A make up a register index field.

FIG. 16A is a block diagram illustrating both an exemplary in-order pipeline and an exemplary register renaming, out-of-order issue/execution pipeline according to embodiments of the invention.

FIG. 16B shows processor core including a front end unit coupled to an execution engine unit, and both are coupled to a memory unit.

FIG. 23 is a block diagram contrasting the use of a software instruction converter to convert binary instructions in a source instruction set to binary instructions in a target instruction set according to embodiments of the invention.

DETAILED DESCRIPTION

Disclosed herein are packed data operation mask concatenation instructions, processors to execute the packed data operation mask concatenation instructions, methods performed by the processors when processing or executing the packed data operation mask concatenation instructions, and systems incorporating one or more processors to process or execute the packed data operation mask concatenation instructions. In the following description, numerous specific details are set forth. However, it is understood that embodiments of the invention may be practiced without these specific details. In other instances, well-known circuits, structures and techniques have not been shown in detail in order not to obscure the understanding of this description.

Figure 1:
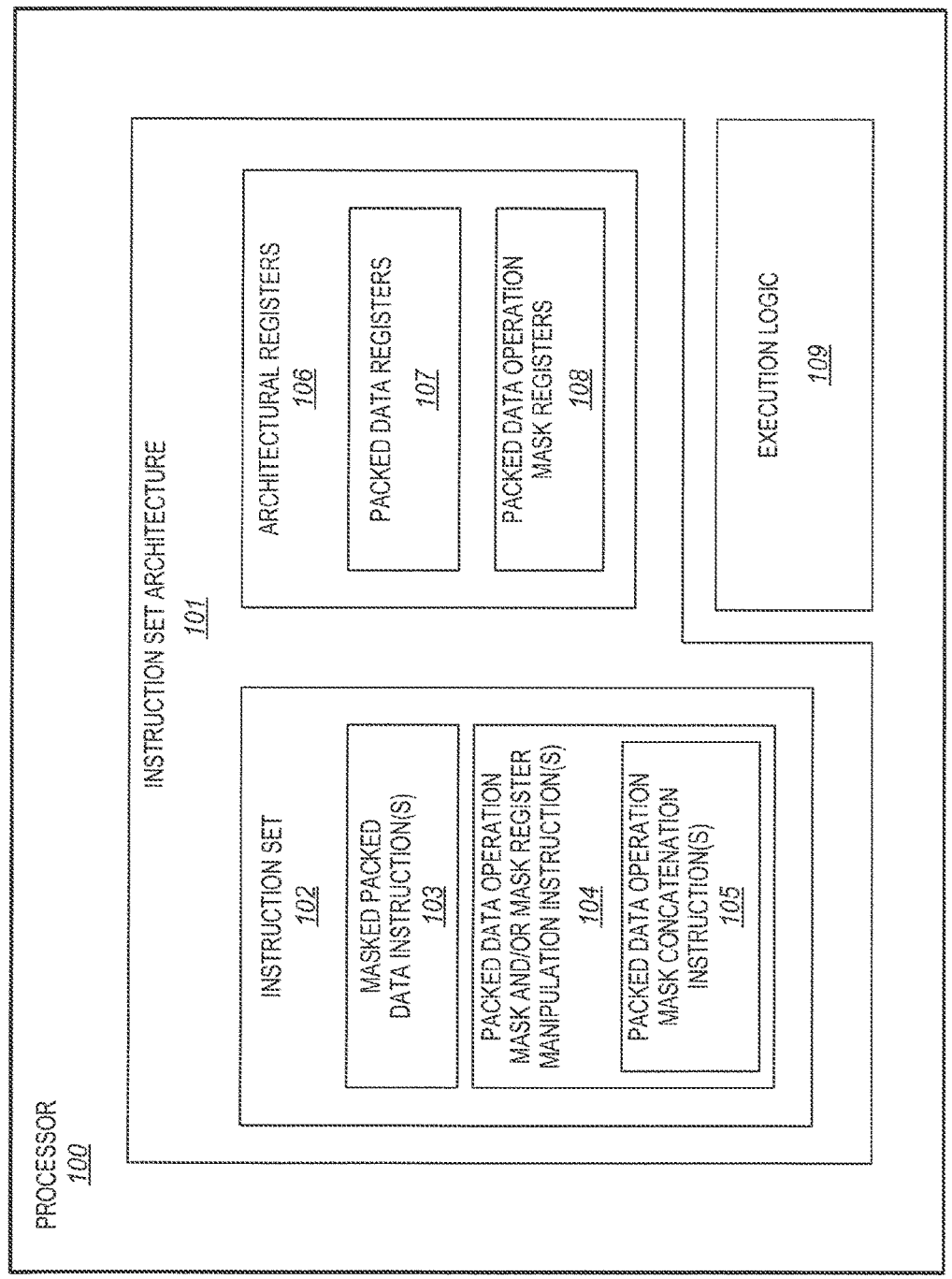
FIG. 1 is a block diagram of an example embodiment of a processor having an instruction set including one or more packed data operation mask concatenation instructions.

FIG. 1 is a block diagram of an example embodiment of a processor 100 having an instruction set including one or more packed data operation mask concatenation instructions 105. The processor may be any of various complex instruction set computing (CISC) processors, various reduced instruction set computing (RISC) processors, various very long instruction word (VLIW) processors, various hybrids thereof, or other types of processors entirely. In one or more embodiments, the processor may be a general-purpose processor (e.g., a general-purpose microprocessor of the type used in desktop, laptop, and like computers), although this is not required. Alternatively, the instruction processing apparatus may be a special-purpose processor. Examples of suitable special-purpose processors include, but are not limited to, network processors, communications processors, cryptographic processors, graphics processors, coprocessors, embedded processors, digital signal processors (DSPs), and controllers (e.g., microcontrollers), to name just a few examples.

The processor has an instruction set architecture (ISA) 101. The ISA represents the part of the architecture of the processor related to programming. The ISA commonly includes the native instructions, architectural registers, data types, addressing modes, memory architecture, interrupt and exception handling, and external input and output (I/O) of the processor. The ISA is distinguished from the microarchitecture, which generally represents the particular processor design techniques selected to implement the instruction set architecture. Processors with different microarchitectures may share a common instruction set architecture.

The ISA includes architectural registers (e.g., an architectural register file) 106. The illustrated architectural registers include packed data registers 107. Each of the packed data registers is operable to store packed data, vector data, or SIMD data. The illustrated architectural registers also include packed data operation mask registers 108. Each of the packed data operation mask registers is operable to store a packed data operation mask.

The architectural registers represent on-board processor storage locations. The architectural registers may also be referred to herein simply as registers. Unless otherwise specified or clearly apparent, the phrases architectural register, register file, and register are used herein to refer to registers that are visible to the software and/or programmer (e.g., software-visible) and/or the registers that are specified by macroinstructions to identify operands. These registers are contrasted to other non-architectural registers in a given microarchitecture (e.g., temporary registers, reorder buffers, retirement registers, etc.).

The illustrated ISA also includes an instruction set 102 that is supported by the processor. The instruction set includes several different types of instructions. These instructions of the instruction set represent macroinstructions (e.g., instructions provided to the processor for execution), as opposed to microinstructions or micro-ops (e.g., which result from a decoder of the processor decoding macroinstructions).

The instruction set includes one or more masked packed data instructions 103. The masked packed data instructions may be similar to the packed data instructions mentioned in the background section with a few notable differences. Similar to the aforementioned packed data instructions, each of the masked packed data instructions may be operable to cause or result in the processor performing a packed data operation on data elements of one or more packed data operands that are indicated by the packed data instruction. The packed data operands may be stored in the packed data registers 107. However, each of the masked packed data instructions may use one or more packed data operation mask registers 108 and/or packed data operation masks to mask, predicate, or conditionally control the packed data processing. The packed data operation masks and/or mask registers may represent mask operands, predicate operands, or conditional operation control operands.

The packed data operation masks and/or mask registers may be operable to mask or conditionally control packed data processing at per-data element granularity. For example, the packed data operation masks may be operable to mask whether or not a result of a packed data operation of the masked packed data instruction, performed on individual data elements from a single source packed data operand or individual pairs of corresponding data elements from two source packed data operands, is to be stored in a packed data result. The masked packed data instructions may allow packed data processing of each data element or pair of corresponding data elements to be predicated or conditionally controlled separately and independently of the data elements. The masked packed data instructions, operations, and masks may offer certain advantages, such as, for example, increased code density and/or higher instruction throughput.

Referring again to FIG. 1, the instruction set also includes one or more packed data operation mask and/or mask register manipulation instructions 104. Each of the packed data operation mask and/or mask register manipulation instructions may be operable to cause or result in the processor manipulating or operating on one or more packed data operation mask registers 108 and/or masks. As shown, the packed data operation mask and/or mask register manipulation instructions may include one or more packed data operation mask concatenation instructions 105. Each of the packed data operation mask concatenation instructions 105 may be operable to cause or result in the processor concatenating two or more packed data operation masks (e.g., stored in packed data operation mask registers 108). Various different embodiments of packed data operation mask concatenation instructions will be disclosed further below.

The processor also includes execution logic 109. The execution logic is operable to execute or process the instructions of the instruction set (e.g., the masked packed data instructions and the packed data operation mask concatenation instructions). The execution logic may include execution units, functional units, arithmetic logic units, logic units, arithmetic units, etc.

Figure 2A:
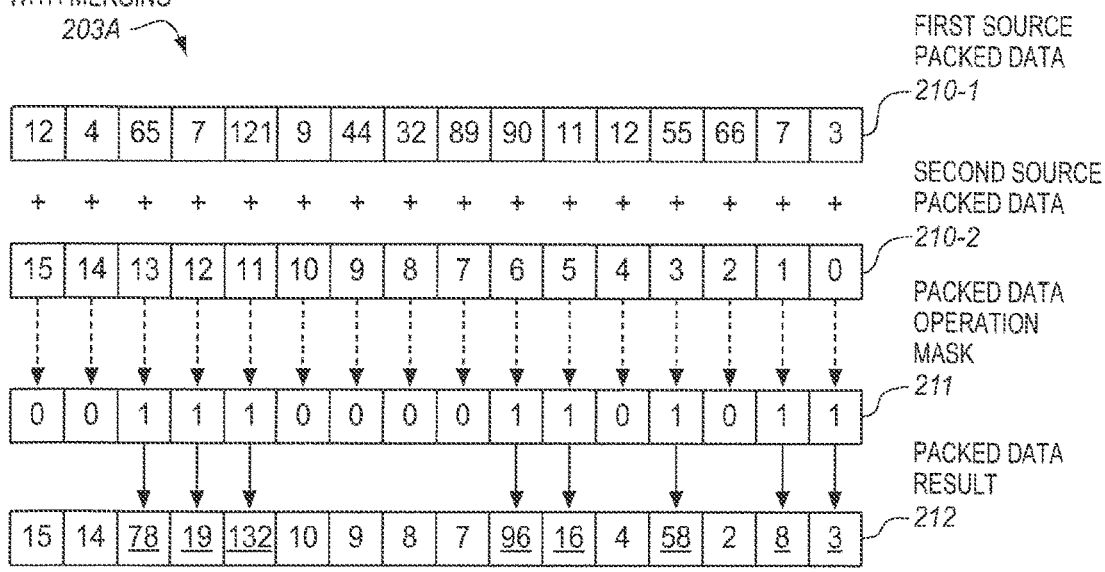
FIG. 2A is a block diagram illustrating a first representative example embodiment of a masked packed data operation with merging.

To further illustrate packed data operation masks, it may be helpful to consider a representative example of their use. FIG. 2A is a block diagram illustrating a first representative example embodiment of a masked packed data operation with merging 203A. The masked packed data operation may be performed in response to, or as a result of, a masked packed data instruction (e.g., one of the masked packed data instructions 103 of FIG. 1).

The instruction for the illustrated masked packed data operation indicates a first source packed data 210-1 and a second source packed data 210-2. Other masked packed data instructions may indicate only a single source packed data, or more than two source packed data. In the illustration, the first and second source packed data are of the same size, contain data elements of the same width, and thus each contain the same number of data elements. In the illustration, each of the first and second source packed data have sixteen data elements. By way of example, the first and second source packed data may each be 512-bits wide and may each include sixteen 32-bit doubleword data elements. The source data elements in the same bit positions in the two source packed data (e.g., in the same vertical positions) represent pairs of corresponding data elements. Each of the data elements has a numerical value shown within the block representing the data element. For example, the lowest order data element (on the right) of the first source packed data has a value of 3, the next-to-lowest order data element of the first source packed data has a value of 7, the highest-order data element (on the left) of the first source packed data has a value of 12, etc.

The instruction of the masked packed data operation also indicates a packed data operation mask 211. The packed data operation mask includes multiple mask elements, predicate elements, conditional control elements, or flags. The elements or flags may be included in a one-to-one correspondence with one or more corresponding source data elements. For example, as shown in the illustration, there may be one such element or flag for each pair of corresponding source data elements in the case of the operation involving two source packed data operands. Each element or flag of the packed data operation mask may be operable to mask a separate packed data operation on the one or more corresponding source packed data elements. For example, in this example, each element or flag may mask a separate packed data operation on a pair of corresponding source packed data elements.

As shown in the illustration, commonly each element or flag may be a single bit. A single bit may allow specifying either of two different possibilities (e.g., perform the operation versus do not perform the operation, store a result of the operation versus do not store a result of the operation, etc.). Alternatively, if selecting between more than two different options is desired, then two or more bits may be used for each flag or element. In the illustration, the packed data operation mask includes sixteen bits (i.e., 0011100001101011). Each of the sixteen bits has an ordered correspondence to one of the sixteen pairs of corresponding data elements of the first and second packed data. For example, the lowest-order bit of the mask corresponds to the pair of corresponding lowest-order data elements of the first and second packed data, the highest-order bit of the mask corresponding to the pair of corresponding highest-order data elements, etc. In alternate embodiments, where the source packed data have either less or more data elements, the packed data operation mask may similarly have either less or more data elements.

The particular illustrated masked packed data operation is a masked packed data addition operation that is operable to conditionally store sums of pairs of corresponding data elements from the first and second source packed data 210-1, 210-2 in the packed data result 212 in accordance with the conditional operation control or predication provided by the corresponding bits of the packed data operation mask 211. This particular masked packed data addition operation specifies that a single operation (in this case addition) is to be conditionally performed in a vertical fashion on each pair of corresponding data elements separately or independently of the other pairs. The destination operand or packed data result is of the same size as the source packed data and has the same number of data elements as the source packed data. Accordingly, each pair of corresponding source data elements has a corresponding result data element in the same bit positions of the packed data result as their corresponding pair of source data elements in the source packed data.

Referring again to the packed data operation mask 211. Each of the sixteen bits of the packed data operation mask is either set (i.e., has a binary value of 1) or is cleared (i.e., has a binary value of 0). According to the illustrated convention, each bit is set (i.e., 1) or cleared (i.e., 0), respectively, to allow or not allow a result of the packed data operation, performed on a corresponding pair of data elements of the first and second source packed data, to be stored in a corresponding data element of the packed data result. For example, the next-to-lowest-order bit in the packed data operation mask is set (i.e., 1), and the sum (i.e., 8) representing the result of the packed data addition operation performed on the pair of corresponding next-to-lowest-order data elements (i.e., 7+1) is stored in the corresponding next-to-lowest-order data element of the packed data result. In the illustration, the sums are underlined.

Conversely, when the given bit is cleared (i.e., 0), then a result of a packed data operation on a corresponding pair of data elements is not allowed to be stored in the corresponding data element of the packed data result. Rather, another value may be stored in the result data element. For example, as shown in the illustration, the value of the corresponding data element from the second source packed data may be stored in the corresponding data element of the packed data result. For example, the highest-order bit in the packed data operation mask is cleared (i.e., 0), and the numerical value (i.e., 15) of the highest-order data element from the second source packed data is stored in the highest-order data element of the packed data result. This is referred to as merging-masking. An opposite convention to that illustrated is also possible where bits are cleared (i.e., 0) to allow the results to be stored, or set (i.e., 1) to not allow the results to be stored.

In some embodiments, the packed data operation may optionally be performed on all corresponding pairs of data elements of the first and second source packed data regardless of whether the corresponding bits of the packed data operation mask are set or cleared, but the results of the packed data operation may or may not be stored in the packed data result depending upon whether the corresponding bits of the packed data operation mask are set or cleared. Alternatively, in another embodiment, the packed data operation may optionally be omitted (i.e., not performed) if the corresponding bit of the packed data operation mask specifies that the result of the operation is not to be stored in the packed data result operation. In some embodiments, exceptions (e.g., exception flags) or violations may optionally be suppressed or not raised by a packed data operation on a masked-off element. In some embodiments, for masked packed data instructions with a memory operand, memory faults may optionally be suppressed for masked-off data elements. This feature may help to implement control-flow predication, since the mask may in effect provide a merging behavior packed data registers, but is not required.

Figure 2B:
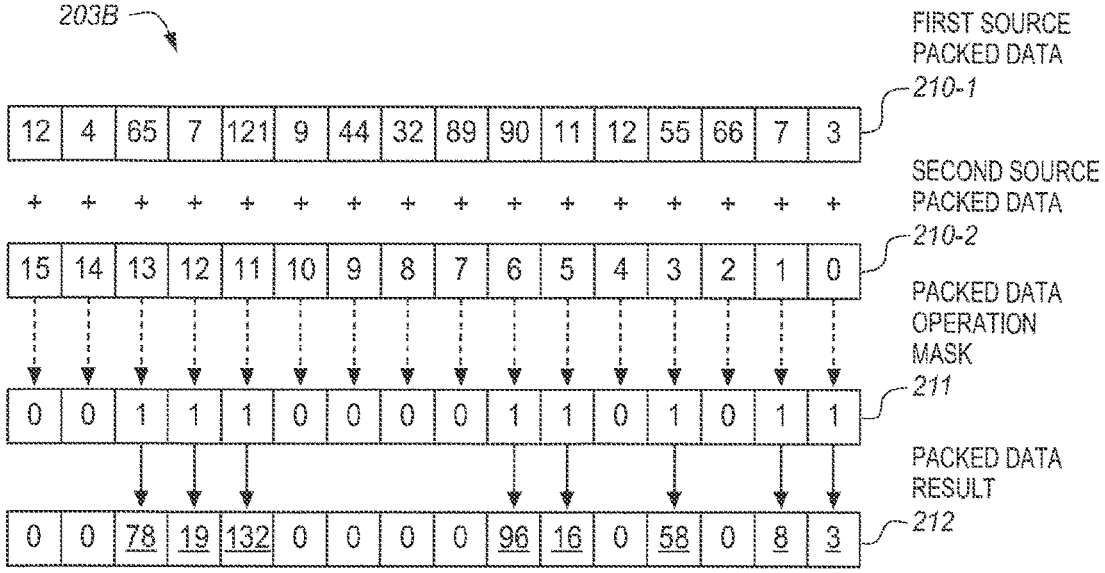
FIG. 2B is a block diagram illustrating a second representative example embodiment of a masked packed data operation with zeroing.

FIG. 2B is a block diagram illustrating a second representative example embodiment of a masked packed data operation with zeroing 203B. The masked packed data operation with zeroing is similar to the aforementioned masked packed data operation with merging. To avoid obscuring the description, the similarities will not be repeated, but rather, the differences will primarily be mentioned. One notable difference is that, instead of merging or storing values of data elements of a source packed data (e.g., the second source packed data 210-2 in FIG. 2A) into the corresponding data elements of the packed data result, when the corresponding bits of the packed data result are masked off (e.g., cleared to 0), the corresponding data elements of the packed data result may be zeroed out. For example, all 32-bits of a doubleword result packed data element may have a value of zero. This is referred to as zeroing-masking. Alternatively, other predetermined values besides zero may optionally be used.

These are just a few illustrative examples of masked packed data operations. It is to be appreciated that a processor may support a wide variety of different types of masked packed data operations. For example, these may include those that have only one, or have more than two, source packed data, those that generate a result packed data of a different size, those that have different sized data elements, and/or those that have a different result data element order, and combinations thereof.

Figure 3:
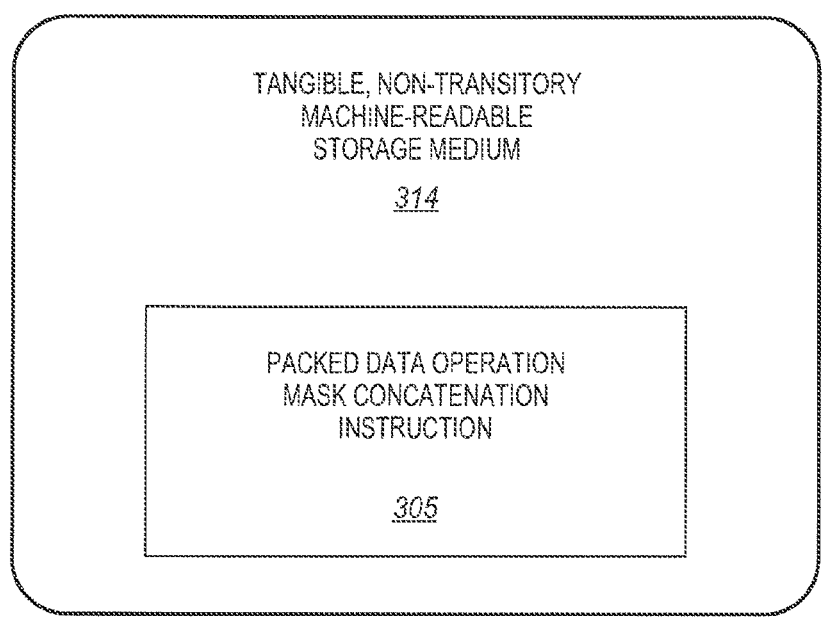
FIG. 3 is a block diagram of an article of manufacture (e.g., a computer program product) including a machine-readable storage medium storing a packed data operation mask concatenation instruction.

FIG. 3 is a block diagram of an article of manufacture (e.g., a computer program product) 313 including a machine-readable storage medium 314 that stores a packed data operation mask concatenation instruction 305. In some embodiments, the machine-readable storage medium may be a tangible and/or non-transitory machine-readable storage medium. In various example embodiments, the machine-readable storage medium 314 may include a floppy diskette, an optical disk, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a semiconductor memory, other types of memory, or a combinations thereof. In some embodiments, the medium may include one or more solid materials, such as, for example, a semiconductor material, a phase-change material, a magnetic material, an optically transparent solid material, etc.

The packed data operation mask concatenation instruction 305 is operable to specify or otherwise indicate a first source of a first packed data operation mask, to specify or otherwise indicate a second source of a second packed data operation mask, and to specify or otherwise indicate a destination. In some embodiments, the packed data operation mask concatenation instruction may be operable to explicitly specify each of the first source, the second source, and the destination. In some embodiments, the first source, the second source, and the destination, may each be a packed data operation mask register, although this is not required (e.g., the destination may be in memory or another storage location). The instruction may have bits or one or more fields defined by an instruction format or encoding of the instruction to explicitly specify the registers or storage locations. In some embodiments, the instruction may follow a VEX encoding scheme, although this is not required. Further details of the VEX encoding scheme, if desired, although not necessary for understanding the present description, are available in the document The Intel® 64 and IA-32 Architectures Software Developer's Manual, Order Number: 253666-039US, May 2011, by Intel Corporation, of Santa Clara, Calif. Alternatively, the instruction may implicitly indicate the sources and/or destination. In some embodiments, the destination may be different than the first and second sources. In other embodiments, one of the first and second sources may be used as the destination (e.g., the result may at least partly overwrite initial data in one of the sources).

The packed data operation mask concatenation instruction, if executed by a machine, is operable to cause the machine to store a result in the destination in response to the packed data operation mask concatenation instruction. The result includes the first packed data operation mask concatenated with the second packed data operation mask. It is to be appreciated that other instructions or sequences of instructions to perform one or more operations or methods as disclosed herein (e.g., a masked packed data instruction indicating a result of the packed data operation mask concatenation instruction as a predicate operand, a closely affiliated packed data instruction, or a routine or algorithm using the packed data operation mask concatenation instruction) may also be stored on the storage medium.

Examples of different types of machines include, but are not limited to, instruction processing apparatus, instruction execution apparatus, processors (e.g., general-purpose processors and special-purpose processors), and various electronic devices having one or more instruction processing apparatus, instruction execution apparatus, and/or processors. A few representative examples of such electronic devices include, but are not limited to, computer systems, desktops, laptops, notebooks, servers, network routers, network switches, nettops, set-top boxes, cellular phones, video game controllers, etc.

Figure 4:
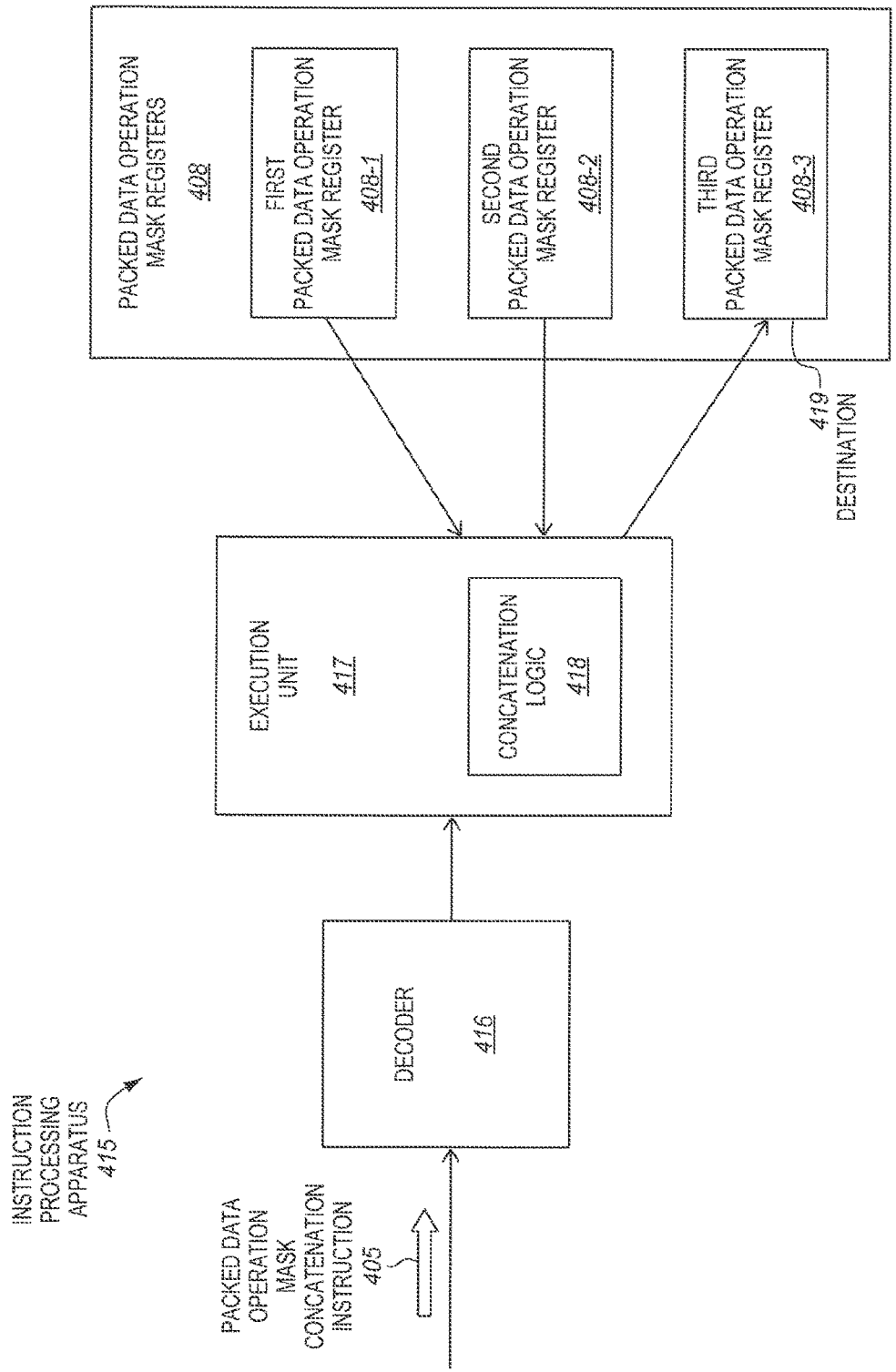
FIG. 4 is a block diagram of an example embodiment of an instruction processing apparatus having an execution unit that is operable to execute instructions including an example embodiment of a packed data operation mask concatenation instruction.

FIG. 4 is a block diagram of an example embodiment of an instruction processing apparatus 415 having an execution unit 417 that is operable to execute instructions including an example embodiment of a packed data operation mask concatenation instruction 405. In some embodiments, the instruction processing apparatus may be a processor and/or may be included in a processor. For example, in some embodiments, the instruction processing apparatus may be, or may be included in, the processor 100 of FIG. 1, or one similar. Alternatively, the instruction processing apparatus may be included in a different processor, or electronic system.

The instruction processing apparatus 415 may receive the packed data operation mask concatenation instruction 405. The instruction may be received from memory, an instruction queue, an instruction fetch unit, or another source. The packed data operation mask concatenation instruction may represent a machine instruction, macroinstruction, or control signal that is recognized by the instruction processing apparatus. The instruction processing apparatus may have specific or particular circuitry or other logic (e.g., software combined with hardware and/or firmware) that is operable to process the instruction and/or store a result in response to, as a result of, or as specified by the instruction.

The illustrated embodiment of the instruction processing apparatus includes an instruction decoder 416. The decoder may receive and decode higher-level machine instructions or macroinstructions, such as the received packed data operation mask concatenation instruction. The decoder may generate and output one or more lower-level micro-operations, micro-code entry points, microinstructions, or other lower-level instructions or control signals, which reflect and/or are derived from the original higher-level instruction. The one or more lower-level instructions or control signals may implement the operation of the higher-level instruction through one or more lower-level (e.g., circuit-level or hardware-level) operations. The decoder may be implemented using various different mechanisms. Examples of suitable mechanisms include, but are not limited to, microcode read only memories (ROMs), look-up tables, hardware implementations, programmable logic arrays (PLAs), other mechanisms used to implement decoders known in the art, etc.

Alternatively, rather than having the decoder 416, in one or more other embodiments, the apparatus may instead have an instruction emulator, translator, morpher, interpreter, or other instruction conversion logic. Various different types of instruction conversion logic are known in the arts and may be implemented in software, hardware, firmware, or a combination thereof. The instruction conversion logic may receive the packed data operation mask concatenation instruction, emulate, translate, morph, interpret, or otherwise convert it into one or more corresponding derived instructions or control signals. In still other embodiments, the instruction processing apparatus may have both a decoder and additional instruction conversion logic. For example, the instruction processing apparatus may have instruction conversion logic to convert the packed data operation mask concatenation instruction into a second instruction, and a decoder to decode the second instruction into one or more lower-level instructions or control signals executable by native hardware of the instruction processing apparatus. Some or all of the instruction conversion logic may be located off-die from the rest of the instruction processing apparatus, such as on a separate die or in an off-die memory.

Referring again to FIG. 4, the instruction processing apparatus also includes a first packed data operation mask register 408-1 that is operable to store a first packed data operation mask and a second packed data operation mask register 408-2 that is operable to store a second packed data operation mask. As previously mentioned, the instruction may explicitly specify (e.g., through bits or one or more fields) or otherwise indicate the first packed data operation mask register, the second packed data operation mask register, and a destination 419. In some embodiments, the destination may be a third packed data operation mask register 408-3. Alternatively, the destination storage location may be another register or memory location. In some embodiments, the first, second, and third packed data operation mask registers may be among a set of packed data operation mask registers (e.g., a register file) 408.

The packed data operation mask registers may each represent an on-board processor storage location. The packed data operation mask registers may represent architectural registers. The packed data operation mask registers may be visible to the software and/or programmer (e.g., software-visible) and/or may be registers that are indicated or specified by macroinstructions (e.g., the packed data operation mask concatenation instruction) to identify operands. The packed data operation mask registers may be implemented in different ways in different microarchitectures using well known techniques and are not limited to any known particular type of circuit. Various different types of registers are suitable as long as they are capable of storing and providing data as described herein. Examples of suitable types of registers include, but are not limited to, dedicated physical registers, dynamically allocated physical registers using register renaming, and combinations thereof.

The instruction processing apparatus also includes the execution unit 417. The execution unit is coupled with the first, second, and third packed data operation mask registers. The execution unit is also coupled with the decoder. The execution unit may receive from the decoder one or more micro-operations, micro-code entry points, microinstructions, other instructions, or other control signals, which reflect, or are derived from, the packed data operation mask concatenation instruction.

The execution unit is operable, in response to and/or as a result of the packed data operation mask concatenation instruction, to store a result in the destination. The result includes the first packed data operation mask concatenated with the second packed data operation mask. By way of example, the execution unit may include an arithmetic logic unit, logic unit, arithmetic unit, functional unit, or the like. The execution unit may include concatenation logic 418 operable to concatenate the first and second packed data operation masks. The execution unit and/or the concatenation logic may include circuitry or other execution logic (e.g., software, firmware, hardware, or a combination) operable to implement the operation of the instruction (e.g., execute one or more microinstructions).

In some embodiments, the first and second packed data operation masks have the same size, although this is not required. In various embodiments, the size of each of the packed data operation masks is 8-bits, 16-bits, or 32-bits. In some embodiments, the size of the packed data operation masks may be implicit to the packed data operation mask concatenation instruction (e.g., implicit to an opcode of the instruction). In some embodiments, an instruction set may include a different packed data operation mask concatenation instruction for each of multiple different sizes of packed data operation masks (e.g., one instruction for 8-bit masks, another instruction for 16-bit masks, yet another instruction for 32-bit masks, etc.). The packed data operation mask registers and/or the sources may be at least as large as, or optionally larger than, the largest size packed data operation mask. In one example, the packed data operation mask registers may be 64-bits wide, although this is not required. The packed data operation masks may contain the active bits, utilized bits, or meaningful bits of the packed data operation mask register, whereas the remaining bits of the packed data operation mask registers not used for the packed data operation masks may represent non-active bits, un-utilized bits, un-meaningful bits, or extraneous bits.

In some embodiments, the bits of the first packed data operation mask as they appear in the result are in a same order as bits of the first packed data operation mask as they appear in the first source, and the bits of the second packed data operation mask as they appear in the result are in a same order as bits of the second packed data operation mask as they appear in the second source. In some embodiments, the first and second packed data operation masks may be in corresponding portions of the first and second sources (e.g., corresponding lowest order portions, corresponding highest order portions, etc.), and the execution unit may be operable to store the concatenated packed data operation masks in twice as many bits of a corresponding portion of the destination. In some embodiments, the execution unit may further be operable to zero bits of the destination that are not used to store the concatenated masks, or alternatively give these bits another predetermined value.

To further illustrate, in embodiments the first and second packed data operation masks may each be 8-bits, and the sources and destination (e.g., the packed data operation mask registers) may each have (N+1)-bits, where (N+1)-bits is greater than 32-bits (e.g., is 64-bits). In such embodiments, the first packed data operation mask may be stored in bits [7:0] of the first source, and the second packed data operation mask may be stored in bits [7:0] of the second source. In response to and/or as a result of the packed data operation mask concatenation instruction, the execution unit may be operable to store a result that includes the first packed data operation mask in bits [7:0] of the destination and the second packed data operation mask in bits [15:8] of the destination. In some embodiments, bits [N:8] of the first source are all zeroes, and bits [N:8] of the second source are all zeroes, and the execution unit is operable to store zeros in bits [N:16] of the destination.

In other embodiments, the first and second packed data operation masks may each be 16-bits, and the sources and destination (e.g., the packed data operation mask registers) may each have (N+1)-bits, where (N+1)-bits is greater than 32-bits (e.g., is 64-bits). In such embodiments, the first packed data operation mask may be stored in bits [15:0] of the first source, and the second packed data operation mask may be stored in bits [15:0] of the second source. In response to and/or as a result of the packed data operation mask concatenation instruction, the execution unit may be operable to store a result that includes the first packed data operation mask in bits [15:0] of the destination and the second packed data operation mask in bits [31:16] of the destination. In some embodiments, bits [N:16] of the first source are all zeroes, and bits [N:16] of the second source are all zeroes, and the execution unit is operable to store zeros in bits [N:32] of the destination.

In still other embodiments, the first and second packed data operation masks may each be 32-bits, and the sources and destination (e.g., the packed data operation mask registers) may each have (N+1)-bits, where (N+1)-bits is at least 64-bits. In such embodiments, the first packed data operation mask may be stored in bits [31:0] of the first source, and the second packed data operation mask may be stored in bits [31:0] of the second source. In response to and/or as a result of the packed data operation mask concatenation instruction, the execution unit may be operable to store a result that includes the first packed data operation mask in bits [31:0] of the destination and the second packed data operation mask in bits [63:32] of the destination. In some embodiments, bits [N:32] of the first source are all zeroes, and bits [N:32] of the second source are all zeroes. If the destination has more than 64-bits, then the execution unit may be operable to store zeros in bits [N:64] of the destination.

To avoid obscuring the description, a relatively simple instruction processing apparatus has been shown and described. In other embodiments, the instruction processing apparatus or processor may optionally include other well-known components, such as, for example, an instruction fetch unit, an instruction scheduling unit, a branch prediction unit, instruction and data caches, instruction and data translation lookaside buffers, prefetch buffers, microinstruction queues, microinstruction sequencers, bus interface units, second or higher level caches, a retirement unit, a register renaming unit, or various different combinations thereof. Moreover, other embodiments may have multiple different types of execution units, with at least one of these execution units being responsive to an embodiment of an instruction as disclosed herein. Still other embodiments may have multiple cores, logical processors, or execution engines. An execution unit operable to execute an embodiment of an instruction as disclosed herein may be included within at least one, at least two, most, or all of the cores, logical processors, or execution engines. There are literally numerous different possible combinations and configurations of such components in processors and other instruction processing apparatus. The scope of the invention is not limited to any known such combination or configuration.

Figure 5:
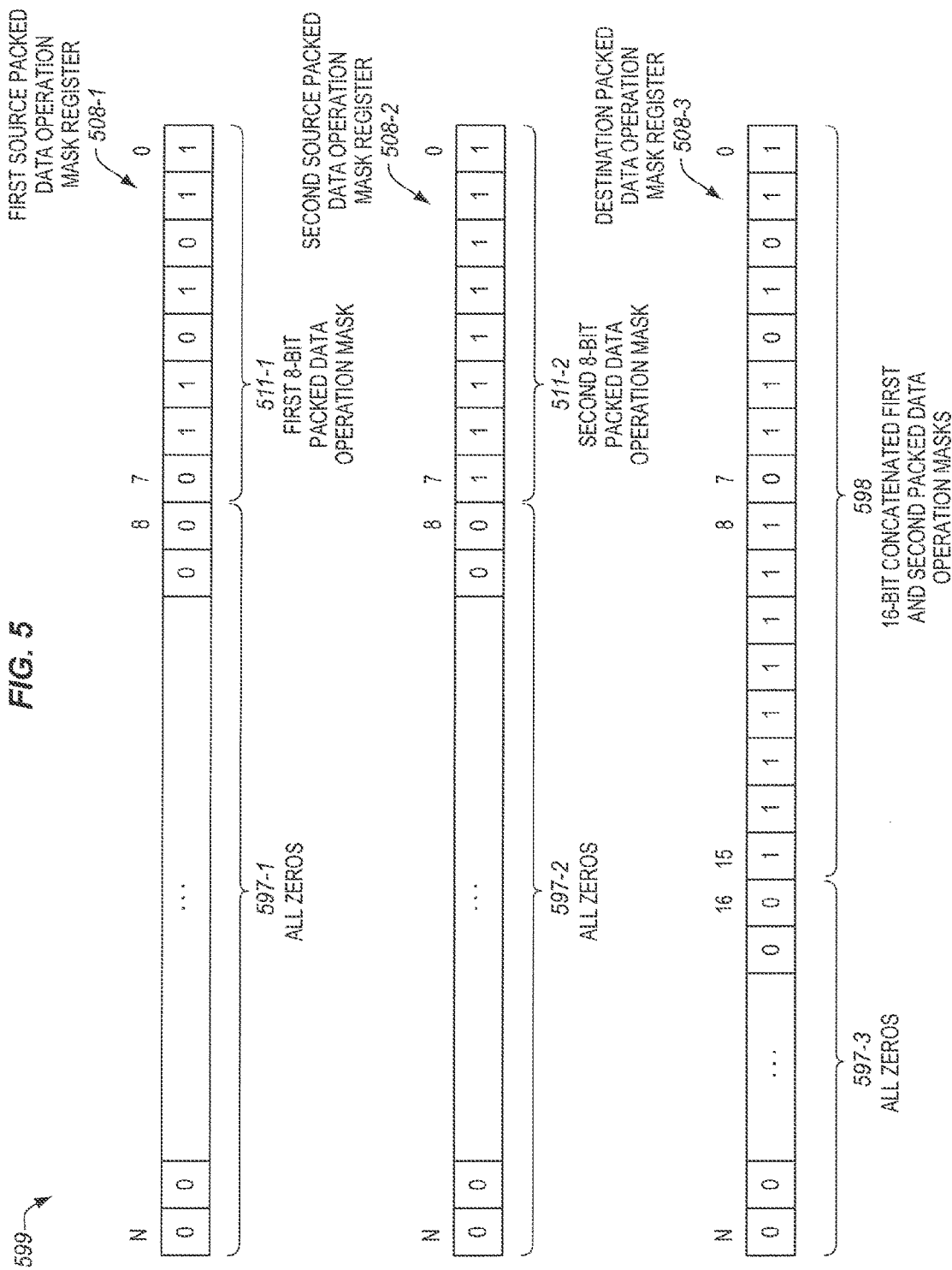
FIG. 5 is a block diagram of an example embodiment of a packed data operation mask concatenation operation that may be performed by a processor and/or execution unit in response to, and/or as a result of, a packed data operation mask concatenation instruction.

FIG. 5 is a block diagram of an example embodiment of a packed data operation mask concatenation operation 599 that may be performed by a processor and/or execution unit in response to and/or as a result of a packed data operation mask concatenation instruction (e.g., instruction 405). The instruction indicates a first source packed data operation mask register 508-1, a second source packed data operation mask register 508-2, and a destination packed data operation mask register 508-3.

In this example embodiment, a first 8-bit packed data operation mask 511-1 is stored in bits [7:0] of the first source packed data operation mask register 508-1, and a second 8-bit packed data operation mask 511-2 is stored in bits [7:0] of the second source packed data operation mask register 508-2. In other embodiments, the packed data operation masks may be either wider (e.g., 32-bits, etc.) or narrower (e.g., 4-bits, 8-bits, etc.). Moreover, in other embodiments, the masks may be stored in other portions of the registers (e.g., in most significant bits). The source and destination packed data operation mask registers are each (N+1)-bits wide, where N is an integer number of bits. In some embodiments, these registers may each be 64-bits. Alternatively, these registers may be either wider (e.g., 80-bits, 128-bits, etc.) or narrower (e.g., 8-bits, 16-bits, 32-bits, 48-bits, etc.). In some embodiments, bits [N:8] of the first source packed data operation mask register are all zeroes 597-1, and bits [N:8] of the second source packed data operation mask register are all zeroes 597-2, although this is not required.

A result is stored in the destination packed data operation mask register 508-3 in response to and/or as a result of the packed data operation mask concatenation instruction. As shown, in some embodiments, the result may include a 16-bit concatenation of the first and second 8-bit packed data operation masks 598. The first packed data operation mask 511-1 may be stored in bits [7:0] of the destination and the second packed data operation mask 511-2 may be stored in bits [15:8] of the destination. In an alternate embodiment, the locations of these masks may be swapped in the destination. In some embodiments, zeros may be stored in bits [N:16] of the destination. Alternatively, another predetermined value may be stored in bits [N:16] of the destination, or the initial bits in bits [N:16] of the destination may be unchanged. Operations similar to the one shown in this illustration may be performed for other sizes of packed data operation masks (e.g., 16-bit masks, 32-bit masks, etc.)

Figure 6:
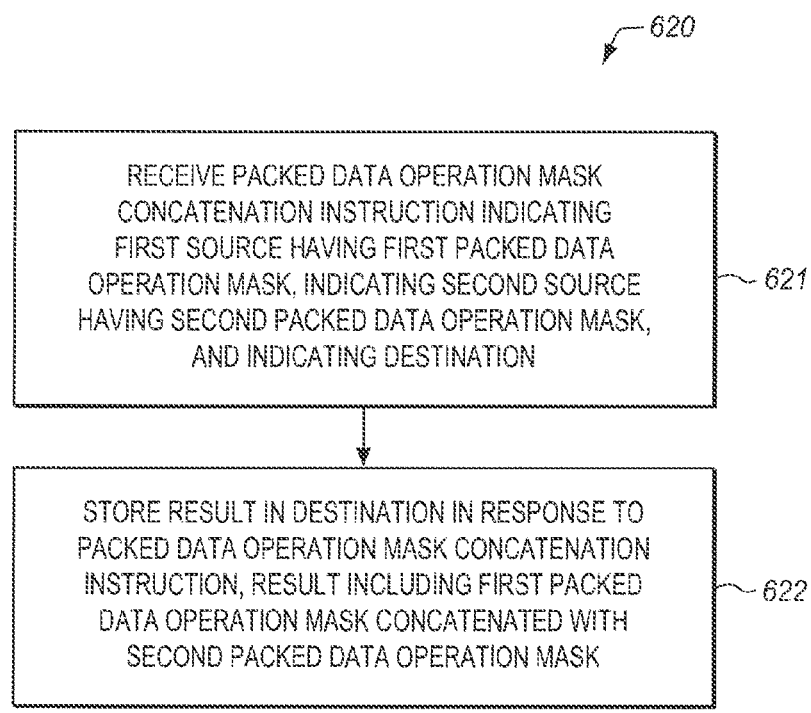
FIG. 6 is a block flow diagram of an example embodiment of a method of processing an example embodiment of a packed data operation mask concatenation instruction.

FIG. 6 is a block flow diagram of an example embodiment of a method 620 of processing an example embodiment of a packed data operation mask concatenation instruction. In various embodiments, the method may be performed by a general-purpose processor, a special-purpose processor (e.g., a graphics processor or a digital signal processor), or another type of digital logic device or instruction processing apparatus. In some embodiments, the method 620 may be performed by the processor 100 of FIG. 1, or the instruction processing apparatus 415 of FIG. 4, or a similar processor or instruction processing apparatus. Alternatively, the method 620 may be performed by different embodiments of processors or instruction processing apparatus. Moreover, the processor 100 of FIG. 1, and the instruction processing apparatus 415 of FIG. 4, may perform embodiments of operations and methods either the same as, similar to, or different than those of the method 620 of FIG. 6.

The method includes receiving the packed data operation mask concatenation instruction, at block 621. The packed data operation mask concatenation instruction specifies or otherwise indicates a first source having a first packed data operation mask, specifies or otherwise indicates a second source having a second packed data operation mask, and specifies or otherwise indicates a destination. In various aspects, the instruction may be received at a processor, an instruction processing apparatus, or a portion thereof (e.g., a decoder, instruction converter, etc.). In various aspects, the instruction may be received from an off-processor source (e.g., from a main memory, a disc, or a bus or interconnect), or from an on-processor source (e.g., from an instruction cache).

Then, a result is stored in the destination in response to, as a result of, and/or as specified by the packed data operation mask concatenation instruction, at block 622. The result includes the first packed data operation mask concatenated with the second packed data operation mask. By way of example, an execution unit, instruction processing apparatus, or processor may concatenate the masks and store the result.

In some embodiments, the first and second packed data operation masks may have the same size, although this is not required. In various embodiments, the size of each of the packed data operation masks is 8-bits, 16-bits, or 32-bits, although other sizes are also possible. In some embodiments, the size of the packed data operation masks may be implicit to the packed data operation mask concatenation instruction (e.g., implicit to an opcode of the instruction). The packed data operation mask registers and/or the sources may be at least as large as, or optionally larger than, the largest size packed data operation mask. In one example, the packed data operation mask registers may be 64-bits wide, although this is not required.

In some embodiments, the first and second packed data operation masks may be in corresponding portions of the first and second sources (e.g., corresponding lowest order portions, corresponding highest order portions, etc.), and the concatenated packed data operation masks may be stored in twice as many bits of a corresponding portion of the destination (e.g., a lowest order portion if the mask is stored in a lowest order portion). In some embodiments, bits of the destination that are not used to store the concatenated masks may optionally be zeroed, or alternatively given another predetermined value, or the bits initially in the register may simply be left alone and/or unchanged.

The illustrated method includes operations that are visible from outside a processor or instruction processing apparatus (e.g., from a software perspective). In other embodiments, the method may optionally include one or more other operations (e.g., one or more operations occurring internally within the processor or instruction processing apparatus). By way of example, after the instruction is received, the instruction may be decoded, translated, emulated, or otherwise converted, into one or more other instructions or control signals. The first and second packed data operation masks may be accessed and/or received. An execution unit may be enabled to generate or perform the concatenation according to the instruction, and may generate or perform the concatenation.

The method may also be used along with other operations and/or methods. For example, an additional operation may include receiving a masked packed data instruction that indicates the result or the destination stored at block 621 as a mask or predicate operand to mask or predicate a packed data operation on packed data. As another example, as will be explained further below, in some embodiments, the method may be performed in conjunction with a closely affiliated or associated packed data instruction, such as, for example, a pack instruction that is to pack data elements from two source packed data into a packed data result. An additional operation may include receiving a pack instruction specifying first and second packed data and specifying a rearrangement and/or concatenation of the data elements of the first and second packed data. The method for the packed data operation mask concatenation instruction may be used to rearrange and/or concatenate the bits of the first and second packed data operation masks, which may each correspond to a different one of the data elements of the first and second packed data, to help to maintain position correspondence between the bits of the packed data operation masks and the corresponding data elements of the packed data result, which may facilitate further masking operations. The scope of the invention is not limited to being used in conjunction with such an instruction, but rather the instructions disclosed herein have more general uses.

Figure 7:
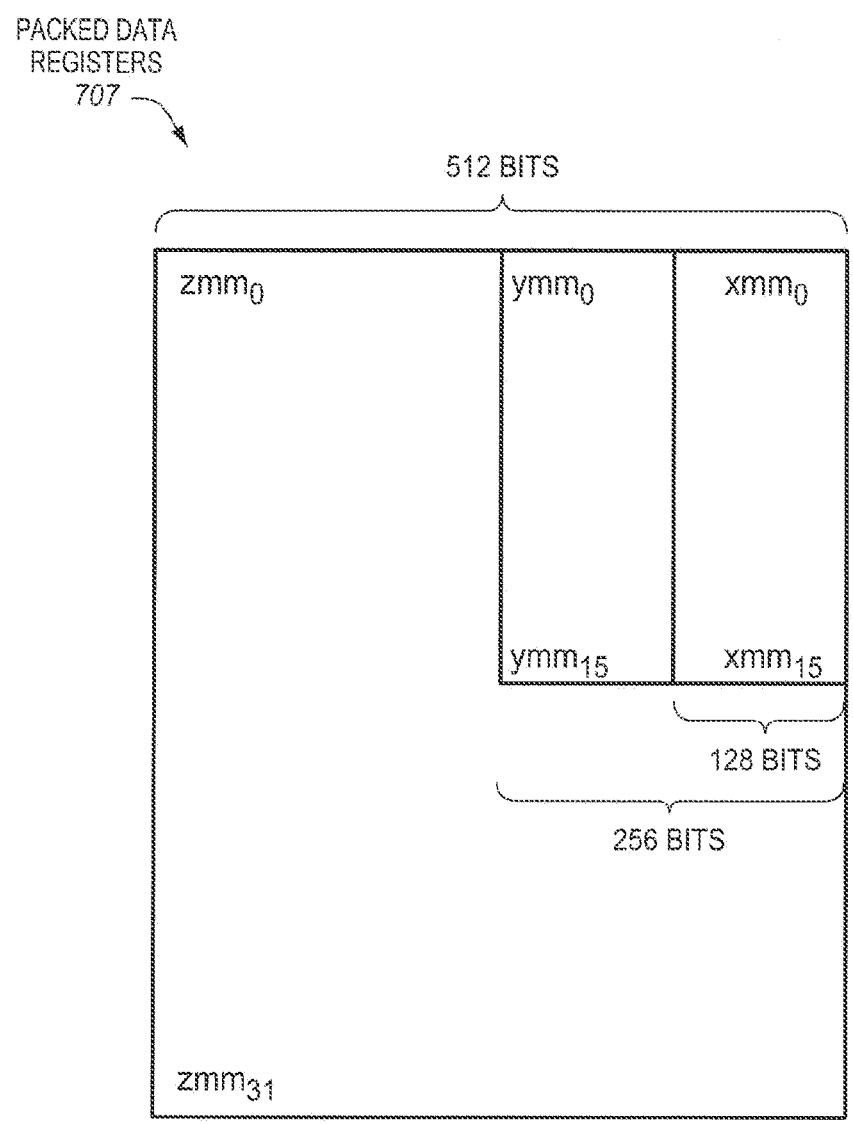
FIG. 7 is a block diagram of an example embodiment of a suitable set of packed data registers.

FIG. 7 is a block diagram of an example embodiment of a suitable set of packed data registers 707. The illustrated packed data registers include thirty-two 512-bit wide packed data or vector registers. These thirty-two 512-bit wide registers are labeled ZMM0 through ZMM31. In the illustrated embodiment, the lower order 256-bits of the lower sixteen of these registers, namely ZMM0-ZMM15, are aliased or overlaid on respective 256-bit wide packed data or vector registers labeled YMM0-YMM15, although this is not required. Likewise, in the illustrated embodiment, the lower order 128-bits of YMM0-YMM15 are aliased or overlaid on respective 128-bit packed data or vector registers labeled XMM0-XMM1, although this also is not required. The 512-bit wide registers ZMM0 through ZMM31 are operable to hold 512-bit packed data, 256-bit packed data, or 128-bit packed data. The 256-bit wide registers YMM0-YMM15 are operable to hold 256-bit packed data, or 128-bit packed data. The 128-bit wide registers XMM0-XMM1 are operable to hold 128-bit packed data. Each of the registers may be used to store either packed floating-point data or packed integer data. Different data element sizes are supported including at least 8-bit byte data, 16-bit word data, 32-bit doubleword or single precision floating point data, and 64-bit quadword or double precision floating point data. Alternate embodiments of packed data registers may include different numbers of registers, different sizes of registers, and may or may not alias larger registers on smaller registers.

Figure 8:
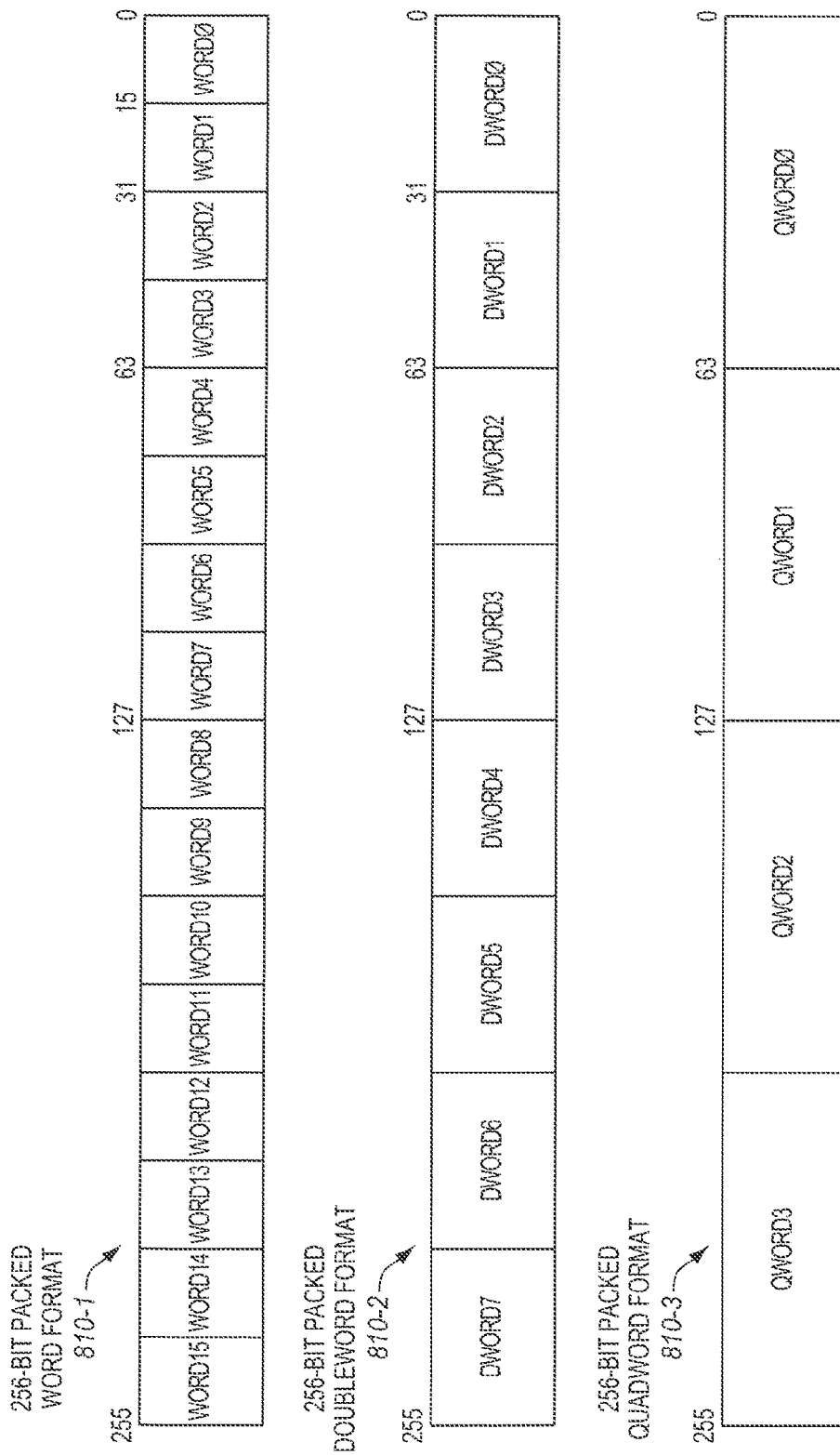
FIG. 8 is a block diagram illustrating several example embodiments of suitable packed data formats.

FIG. 8 is a block diagram illustrating several example embodiments of suitable packed data formats. A 256-bit packed word format 810-1 is 256-bits wide and includes sixteen 16-bit word data elements. The sixteen 16-bit word data elements are labeled in the illustration from least to most significant bit positions as WORD0 through WORD15. A 256-bit packed doubleword format 810-2 is 256-bits wide and includes eight 32-bit doubleword (dword) data elements. The eight 32-bit doubleword data elements are labeled in the illustration from least to most significant bit positions as DWORD0 through DWORD7. A 256-bit packed quadword format 810-3 is 256-bits wide and includes four 64-bit quadword data elements. The four 64-bit quadword data elements are labeled in the illustration from the least to most significant bit positions as QWORD0 through QWORD3.

Other packed data formats are also suitable. For example, other suitable 256-bit packed data formats include 256-bit packed 8-bit byte format, 256-bit packed 32-bit single precision floating point format, and 256-bit packed 64-bit double precision floating point format. The single and double precision floating point formats may respectively appear similar to the illustrated doubleword format 810-2 and quadword format 810-3, although the meaning/interpretation of the bits within the data elements may be different. Moreover, packed data formats either larger and/or smaller than 256-bits are also suitable. For example, 512-bit (or larger) packed data formats and/or 128-bit (or smaller) packed data formats of the aforementioned data types are also suitable. In general, the 512-bit packed data formats may have twice as many data elements as the 256-bit packed data formats for the same data type, while the 128-bit packed data formats may have half as many data elements as the 256-bit packed data formats for the same data type. Generally, the number of packed data elements is equal to the size in bits of the packed data divided by the size in bits of the packed data elements.

Figures 9, 10:
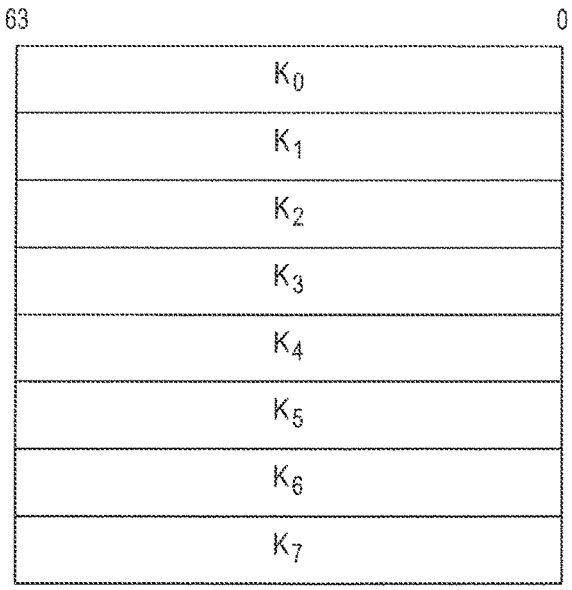
FIG. 9 is a table illustrating that the number of packed data operation mask bits depends upon the packed data width and the packed data element width.
FIG. 10 is a block diagram of an example embodiment of a suitable set of packed data operation mask registers.

FIG. 9 is a table illustrating that the number of packed data operation mask bits 923 depends upon the packed data width and the packed data element width. Packed data widths of 128-bits, 256-bits, and 512-bits are shown, although other widths are also possible. Packed data element widths of 8-bit bytes, 16-bit words, 32-bit doublewords (dwords) or single precision floating point, and 64-bit quadwords (Qwords) or double precision floating point are considered, although other widths are also possible.

As shown, when the packed data width is 128-bits, 16-bits may be used for masking when the packed data element width is 8-bits, 8-bits may be used for masking when the packed data element width is 16-bits, 4-bits may be used for masking when the packed data element width is 32-bits, and 2-bits may be used for masking when the packed data element width is 64-bits. When the packed data width is 256-bits, 32-bits may be used for masking when the packed data element width is 8-bits, 16-bits may be used for masking when the packed data element width is 16-bits, 8-bits may be used for masking when the packed data element width is 32-bits, and 4-bits may be used for masking when the packed data element width is 64-bits. When the packed data width is 512-bits, 64-bits may be used for masking when the packed data element width is 8-bits, 32-bits may be used for masking when the packed data element width is 16-bits, 16-bits may be used for masking when the packed data element width is 32-bits, and 8-bits may be used for masking when the packed data element width is 64-bits.

FIG. 10 is a block diagram of an example embodiment of a suitable set of packed data operation mask registers 1008. Each of the packed data operation mask registers may be used to store a packed data operation mask. In the illustrated embodiment, the set includes eight packed data operation mask registers labeled k0 through k7. Alternate embodiments may include either fewer than eight (e.g., two, four, six, etc.) or more than eight (e.g., sixteen, twenty, thirty-two, etc.) packed data operation mask registers. In the illustrated embodiment, each of the packed data operation mask registers is 64-bits wide. In alternate embodiments, the widths of the packed data operation mask registers may be either wider than 64-bits (e.g., 80-bits, 128-bits, etc.) or narrower than 64-bits (e.g., 8-bits, 16-bits, 32-bits, etc). The packed data operation mask registers may be implemented in different ways using well known techniques and are not limited to any known particular type of circuit. Various different types of registers are suitable as long as they are capable of storing and providing data as described herein. Examples of suitable registers include, but are not limited to, dedicated physical registers, dynamically allocated physical registers using register renaming, and combinations thereof.

In some embodiments, the packed data operation mask registers 908 may be a separate, dedicated set of architectural registers. In some embodiments, the instructions may encode or specify the packed data operation mask registers in different bits or one or more different field combinations of an instruction format than that used to encode or specify other types of registers (e.g., packed data registers 108 of FIG. 1). By way of example, the masked packed data instructions may use three bits (e.g., a 3-bit field) to encode or specify any one of the eight packed data operation mask registers k0 through k7. In alternate embodiments, either fewer or more bits may be used when there are fewer or more packed data operation mask registers, respectively. In one particular implementation, only packed data operation mask registers k1 through k7 (but not k0) may be addressed as a predicate operand to predicate a masked packed data operation. The register k0 may be used as a regular source or destination, but may not be encoded as a predicate operand (e.g., if k0 is specified it has an all ones or "no mask" encoding). In other embodiments, either all or only some of the registers may be encoded as a predicate operand.

Figure 11:
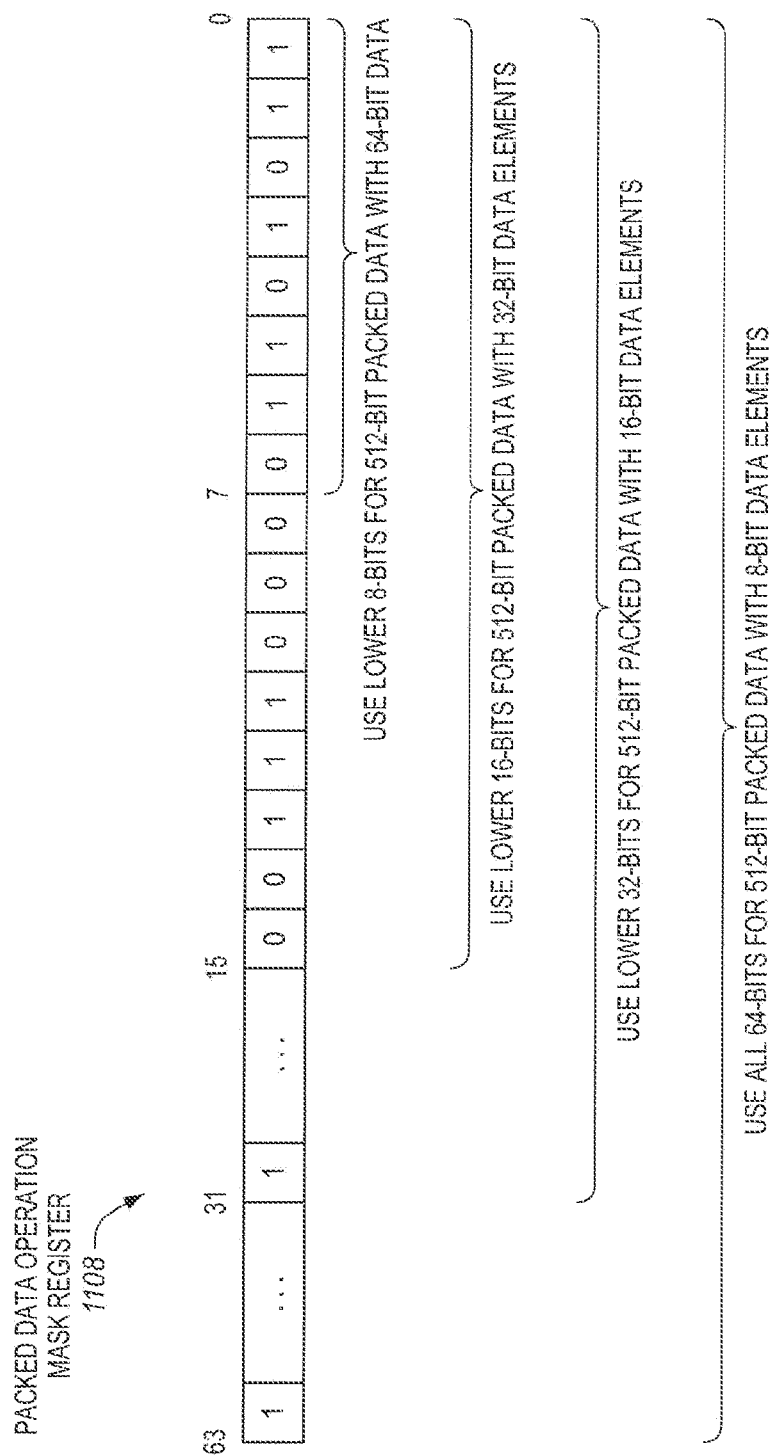
FIG. 11 is a diagram illustrating that the number of bits in an example embodiment of a packed data operation mask register that are used as a packed data operation mask or for masking depends upon the packed data width and the data element width.

FIG. 11 is a diagram illustrating an example embodiment of a packed data operation mask register 1108 and showing that the number of bits that are used as a packed data operation mask and/or for masking depends upon the packed data width and the data element width. The illustrated example embodiment of the packed data operation mask register is 64-bits wide, although this is not required. Depending upon the combination of the packed data width and the data element width, either all 64-bits, or only a subset of the 64-bits, may be used as a packed data operation mask for masking. Generally, when a single, per-element masking control bit is used, the number of bits in the packed data operation mask register that are used for masking is equal to the packed data width in bits divided by the packed data element width in bits.

Several illustrative examples are shown. Namely, when the packed data width is 512-bits and the packed data element width is 64-bits, then only the lowest-order 8-bits of the register are used as the packed data operation mask. When the packed data width is 512-bits and the packed data element width is 32-bits, then only the lowest-order 16-bits of the register are used as the packed data operation mask. When the packed data width is 512-bits and the packed data element width is 16-bits, then only the lowest-order 32-bits of the register are used as the packed data operation mask. When the packed data width is 512-bits and the packed data element width is 8-bits, then all 64-bits of the register are used as the packed data operation mask. In accordance with the illustrated embodiment, a masked packed data instruction may access and/or utilize only the number of lowest order or least significant bits of the register used for the packed data operation mask based on that instructions associated packed data width and data element width.

In the illustrated embodiment, the lowest-order subset or portion of the register is used for masking, although this is not required. In alternate embodiments a highest-order subset, or some other subset, may optionally be used. Moreover, in the illustrated embodiment, only a 512-bit packed data width is considered, however the same principle applies for other packed data widths, such as, for example, 256-bit and 128-bit widths. As previously mentioned, the use of a 64-bit packed data operation mask register is not required.

FIGS. 12A-12C illustrate various particular example embodiments of packed data operation mask concatenation instructions and operations thereof. In these figures, SRC1 is a first source, SRC2 is a second source, DEST is a destination, MAX_KL represents the number of bits of DEST, and the symbol represents storing. In some embodiments, SRC1, SRC2, and DEST are each packed data operation mask registers, and in some embodiments MAX_KL is 64-bits, although this is not required. In other embodiments, rather than the highest order portion of DEST being zeroed, it may be given another predetermined value (e.g., all ones or retain or merge a value from one of SRC1 or SRC2). In still other embodiments, the packed data operation mask from SRC2 may be at lower order bit positions of DEST than the packed data operation mask from SRC1.

The packed data operation mask concatenation instructions disclosed herein are general-purpose instructions that have general uses. For example, these instructions may be used, either alone or in combination with other instructions, to concatenate packed data operation masks and/or mask registers in order to manipulate the masks or mask registers in various different ways that are useful and desired for the particular application, algorithm, or code. In some embodiments, the packed data operation mask concatenation instructions disclosed herein may be used in conjunction with a closely affiliated or associated packed data instruction. In some embodiments, the closely affiliated or associated packed data instruction is a pack instruction, which is operable to pack data elements from two source packed data into a result packed data. Examples of suitable pack instructions are those described in U.S. Pat. No. 5,802,336 and pack instructions that operate on 256-bit and/or 512-bit packed data.

Figure 13:
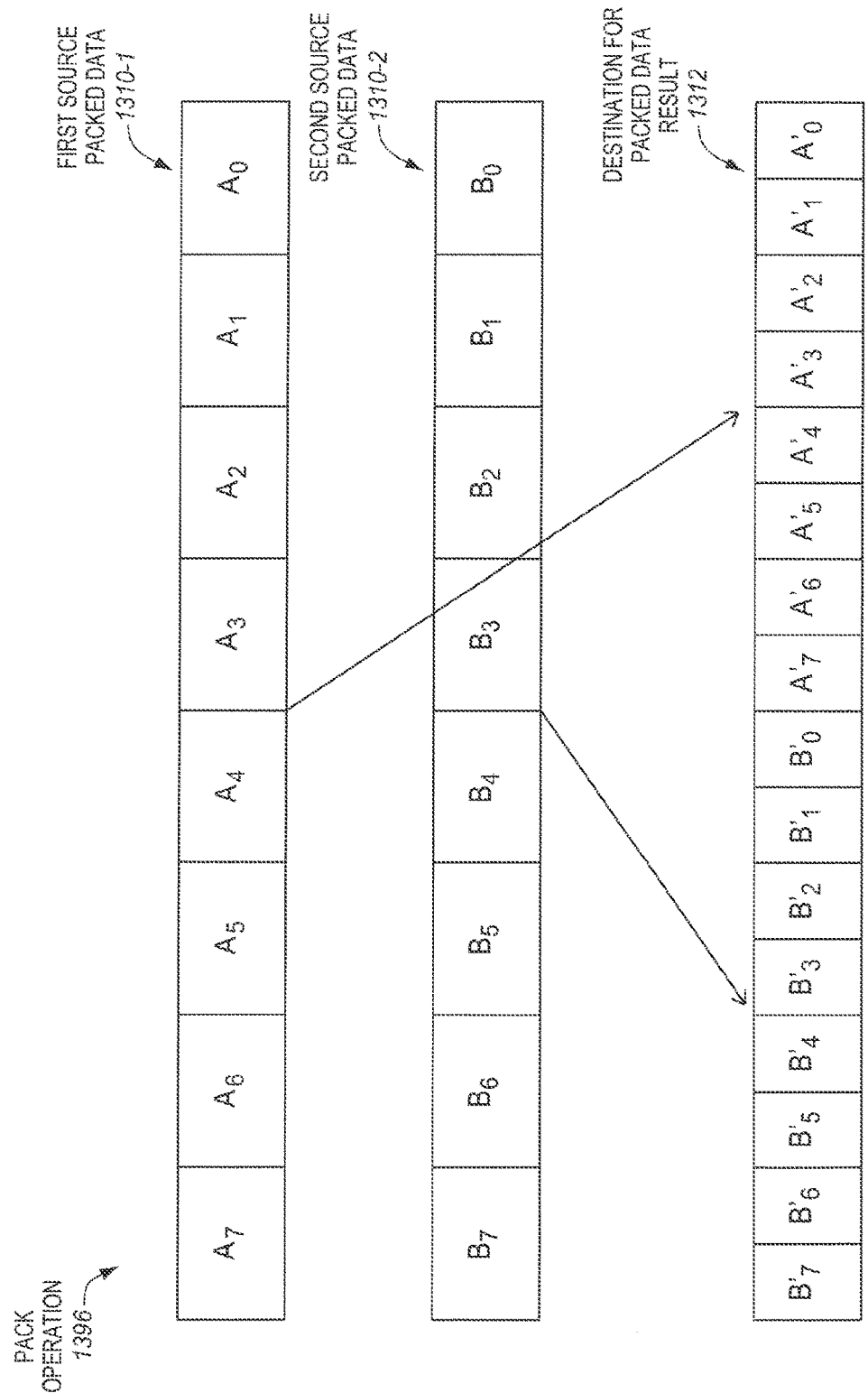
FIG. 13 is a block diagram of an example embodiment of a pack operation that may be performed by a processor and/or execution unit in response to, and/or as a result of, a pack instruction.

FIG. 13 is a block diagram of an example embodiment of a pack operation 1396 that may be performed by a processor and/or execution unit in response to, and/or as a result of, a pack instruction. The pack instruction is operable to indicate a first source packed data 1310-1, a second source packed data 1310-2, and a destination for a packed data result 1312. The first and second source packed data and the destination may all be packed data registers (e.g., packed data registers 107 in FIG. 1). In the illustration, the first and second source packed data and the destination are all the same width (e.g., all 256-bits, all 512-bits, etc.). In this particular example embodiment, the first source packed data has eight data elements, which are labeled $A_0$-$A_7$. The second source packed data has eight data elements, which are labeled $B_0$-$B_7$. As one example, the first and second source packed data may each be 256-bits wide, and the data elements may each be 32-bit doublewords (dwords).

The packed data result may be stored in the destination in response to the packed data instruction. The packed data result includes sixteen data elements, which are labeled $A_0'$-$A_7'$ and $B_0'$-$B_7'$. The result data elements $A_0'$-$A_7'$ correspond to the source data elements $A_0$-$A_7$ in a respective position (e.g., $B_2'$ corresponds to $B_2$, $B_5'$ corresponds to $B_5$, etc.). The result data elements are half as wide in bits as the source data elements, and the result includes all of the data elements from the two sources. Likewise, the result data elements $B_0'$-$B_7'$ correspond to the source data elements $B_0$-$B_7$ in a respective position. In some embodiments, each of the data elements $A_0'$-$A_7'$ includes one of a part of, and a saturation value corresponding to, each corresponding data element of $A_0$-$A_7$ (e.g., $A_0'$ includes a part of $A_0$, $A_6'$ includes a saturation value corresponding to $A_6$, etc.). Likewise, each of the data elements $B_0'$-$B_7'$ includes one of a part of, and a saturation value corresponding to, each corresponding data element of $B_0$-$B_7$.

In some embodiments, a concatenation operation of a packed data operation mask concatenation instruction as disclosed herein may be used to parallel or mirror a pack operation performed on packed data elements of two source packed data as a result of a pack instruction. The bits of the packed data operation masks may be concatenated or rearranged in the same manner in which the data elements of the source packed data are rearranged or packed. The pack instruction and/or operation on the source packed data may be performed in parallel or together in a code sequence with the packed data operation mask concatenation instruction and/or operation. Advantageously, this may help to rearrange the bits of the packed data operation masks and the corresponding packed data elements in an analogous fashion so that the position correspondence between the bits of the packed data operation masks and the corresponding packed data elements may be maintained. Maintaining this position correspondence may help to allow the bits of the packed data operation masks to track with the corresponding packed data elements, so that they may be used to mask subsequent packed data operations (e.g., used by a subsequent masked packed data instruction operating on the packed data result of the pack instruction.) However, the scope of the invention is not limited to using the packed data operation mask concatenation instructions disclosed herein with these pack instructions.

In addition to such pack instructions, the packed data operation mask concatenation instruction may also be used for other instructions, such as one or more other instructions that convert each of the data elements of two packed data to corresponding data elements of half the size (e.g., doublewords to words or bytes). The packed data operation mask concatenation instruction may also be used to temporarily store a first packed data operation mask (which is not needed immediately) in non-active bits of an upper part of a packed data operation mask register that also stores a second packed data operation mask in a least significant portion of active bits thereof. Temporarily storing the first mask in non-active bits of the same register that also stores the second mask in active bits thereof at times when the first mask is not going to be used in the immediate future may help to avoid needing to consume an additional packed data operation mask register to store the first mask. This may help to avoid running out of packed data operation mask registers and/or needing to store packed data operation masks into memory when there are no available packed data operation mask registers. Other uses will be apparent based on the present disclosure.

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to the Advanced Vector Extensions (AVX) (AVX1 and AVX2) and using the Vector Extensions (VEX) coding scheme, has been, has been released and/or published (e.g., see Intel® 64 and IA-32 Architectures Software Developers Manual, October 2011; and see Intel® Advanced Vector Extensions Programming Reference, June 2011).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

VEX Instruction Format

VEX encoding allows instructions to have more than two operands, and allows SIMD vector registers to be longer than 128 bits. The use of a VEX prefix provides for three-operand (or more) syntax. For example, previous two-operand instructions performed operations such as A=A+B, which overwrites a source operand. The use of a VEX prefix enables operands to perform nondestructive operations such as A=B+C.

FIG. 14A illustrates an exemplary AVX instruction format including a VEX prefix 1402, real opcode field 1430, Mod R/M byte 1440, SIB byte 1450, displacement field 1462, and IMM8 1472. FIG. 14B illustrates which fields from FIG. 14A make up a full opcode field 1474 and a base operation field 1442. FIG. 14C illustrates which fields from FIG. 14A make up a register index field 1444.

VEX Prefix (Bytes 0-2) 1402 is encoded in a three-byte form. The first byte is the Format Field 1440 (VEX Byte 0, bits [7:0]), which contains an explicit C4 byte value (the unique value used for distinguishing the C4 instruction format). The second-third bytes (VEX Bytes 1-2) include a number of bit fields providing specific capability. Specifically, REX field 1405 (VEX Byte 1, bits [7-5]) consists of a VEX.R bit field (VEX Byte 1, bit [7]–R), VEX.X bit field (VEX byte 1, bit [6]–X), and VEX.B bit field (VEX byte 1, bit[5]–B). Other fields of the instructions encode the lower three bits of the register indexes as is known in the art (rrr, xxx, and bbb), so that Rrrr, Xxxx, and Bbbb may be formed by adding VEX.R, VEX.X, and VEX.B. Opcode map field 1415 (VEX byte 1, bits [4:0]–mmmmm) includes content to encode an implied leading opcode byte. W Field 1464 (VEX byte 2, bit [7]–W)—is represented by the notation VEX.W, and provides different functions depending on the instruction. The role of VEX.vvvv 1420 (VEX Byte 2, bits [6:3]-vvvv) may include the following: 1) VEX.vvvv encodes the first source register operand, specified in inverted (1s complement) form and is valid for instructions with 2 or more source operands; 2) VEX.vvvv encodes the destination register operand, specified in 1s complement form for certain vector shifts; or 3) VEX.vvvv does not encode any operand, the field is reserved and should contain 1111b. If VEX.L 1468 Size field (VEX byte 2, bit [2]–L)=0, it indicates 128 bit vector; if VEX.L=1, it indicates 256 bit vector. Prefix encoding field 1425 (VEX byte 2, bits [1:0]–pp) provides additional bits for the base operation field.

Real Opcode Field 1430 (Byte 3) is also known as the opcode byte. Part of the opcode is specified in this field.

MOD R/M Field 1440 (Byte 4) includes MOD field 1442 (bits [7-6]), Reg field 1444 (bits [5-3]), and R/M field 1446 (bits [2-0]). The role of Reg field 1444 may include the following: encoding either the destination register operand or a source register operand (the rrr of Rrrr), or be treated as an opcode extension and not used to encode any instruction operand. The role of R/M field 1446 may include the following: encoding the instruction operand that references a memory address, or encoding either the destination register operand or a source register operand.

Scale, Index, Base (SIB)—The content of Scale field 1450 (Byte 5) includes SS1452 (bits [7-6]), which is used for memory address generation. The contents of SIB.xxx 1454 (bits [5-3]) and SIB.bbb 1456 (bits [2-0]) have been previously referred to with regard to the register indexes Xxxx and Bbbb.

The Displacement Field 1462 and the immediate field (IMM8) 1472 contain address data.

Exemplary Register Architecture

Figure 15:
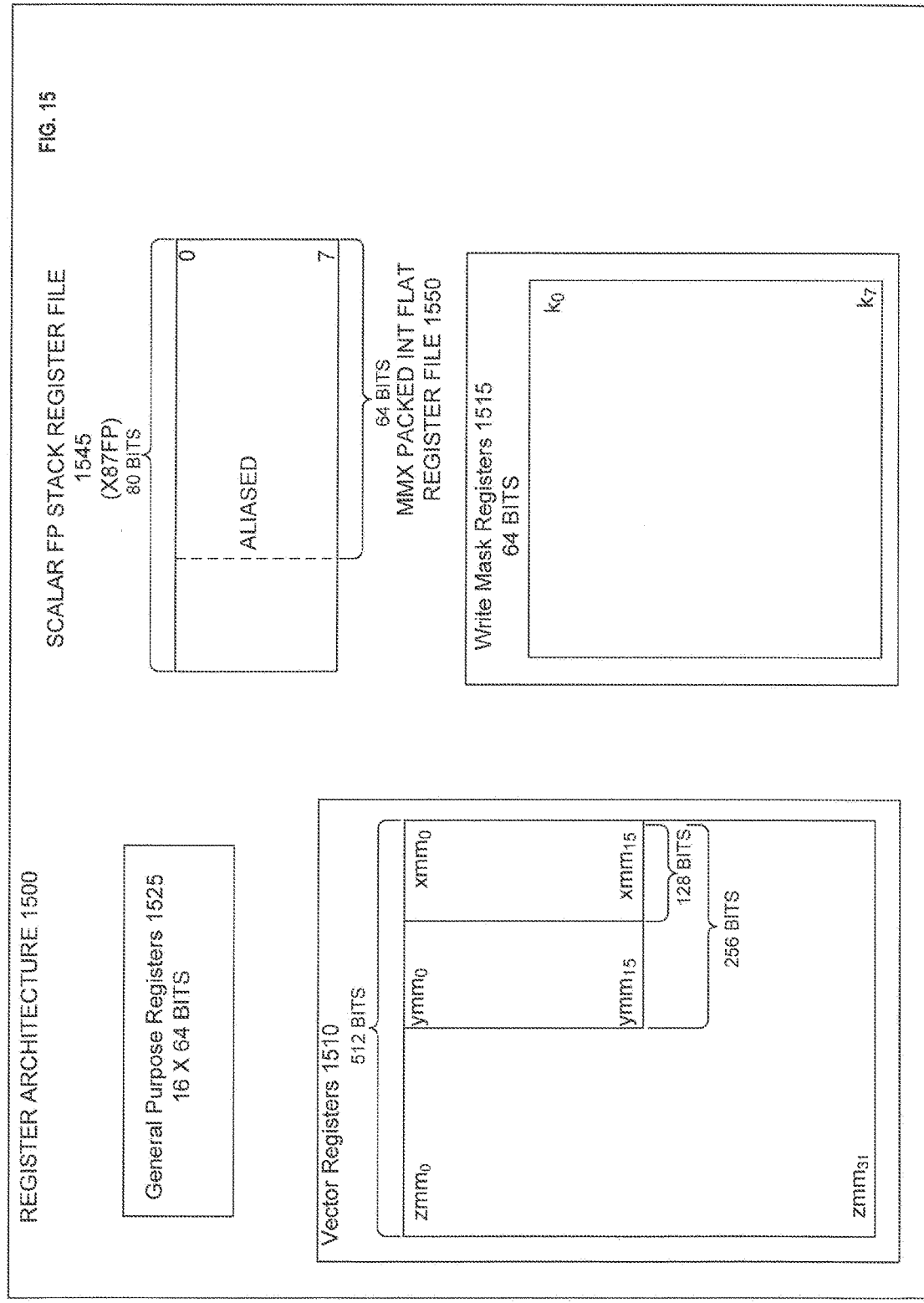
FIG. 15 is a block diagram of a register architecture according to one embodiment of the invention.

FIG. 15 is a block diagram of a register architecture 1500 according to one embodiment of the invention. In the embodiment illustrated, there are 32 vector registers 1510 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15.

Write mask registers 1515—in the embodiment illustrated, there are 8 write mask registers (k0 through k7), each 64 bits in size. In an alternate embodiment, the write mask registers 1515 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 1525—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1545, on which is aliased the MMX packed integer flat register file 1550—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures
In-Order and Out-of-Order Core Block Diagram

FIG. 16A is a block diagram illustrating both an exemplary in-order pipeline and an exemplary register renaming, out-of-order issue/execution pipeline according to embodiments of the invention. FIG. 16B is a block diagram illustrating both an exemplary embodiment of an in-order architecture core and an exemplary register renaming, out-of-order issue/execution architecture core to be included in a processor according to embodiments of the invention. The solid lined boxes in FIGS. 16A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 16A, a processor pipeline 1600 includes a fetch stage 1602, a length decode stage 1604, a decode stage 1606, an allocation stage 1608, a renaming stage 1610, a scheduling (also known as a dispatch or issue) stage 1612, a register read/memory read stage 1614, an execute stage 1616, a write back/memory write stage 1618, an exception handling stage 1622, and a commit stage 1624.

FIG. 16B shows processor core 1690 including a front end unit 1630 coupled to an execution engine unit 1650, and both are coupled to a memory unit 1670. The core 1690 may be a reduced instruction set computing (RISC) core, a complex instruction set computing (CISC) core, a very long instruction word (VLIW) core, or a hybrid or alternative core type. As yet another option, the core 1690 may be a special-purpose core, such as, for example, a network or communication core, compression engine, coprocessor core, general purpose computing graphics processing unit (GPGPU) core, graphics core, or the like.

The front end unit 1630 includes a branch prediction unit 1632 coupled to an instruction cache unit 1634, which is coupled to an instruction translation lookaside buffer (TLB) 1636, which is coupled to an instruction fetch unit 1638, which is coupled to a decode unit 1640. The decode unit 1640 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1640 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1690 includes a microcode ROM or other medium that stores microcode for certain macroinstructions (e.g., in decode unit 1640 or otherwise within the front end unit 1630). The decode unit 1640 is coupled to a rename/allocator unit 1652 in the execution engine unit 1650.

The execution engine unit 1650 includes the rename/allocator unit 1652 coupled to a retirement unit 1654 and a set of one or more scheduler unit(s) 1656. The scheduler unit(s) 1656 represents any number of different schedulers, including reservations stations, central instruction window, etc. The scheduler unit(s) 1656 is coupled to the physical register file(s) unit(s) 1658. Each of the physical register file(s) units 1658 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1658 comprises a vector registers unit, a write mask registers unit, and a scalar registers unit. These register units may provide architectural vector registers, vector mask registers, and general purpose registers. The physical register file(s) unit(s) 1658 is overlapped by the retirement unit 1654 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1654 and the physical register file(s) unit(s) 1658 are coupled to the execution cluster(s) 1660. The execution cluster(s) 1660 includes a set of one or more execution units 1662 and a set of one or more memory access units 1664. The execution units 1662 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1656, physical register file(s) unit(s) 1658, and execution cluster(s) 1660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1664). It should also be understood that where separate pipelines are used, one or more of these pipelines may be out-of-order issue/execution and the rest in-order.

The set of memory access units 1664 is coupled to the memory unit 1670, which includes a data TLB unit 1672 coupled to a data cache unit 1674 coupled to a level 2 (L2) cache unit 1676. In one exemplary embodiment, the memory access units 1664 may include a load unit, a store address unit, and a store data unit, each of which is coupled to the data TLB unit 1672 in the memory unit 1670. The instruction cache unit 1634 is further coupled to a level 2 (L2) cache unit 1676 in the memory unit 1670. The L2 cache unit 1676 is coupled to one or more other levels of cache and eventually to a main memory.

By way of example, the exemplary register renaming, out-of-order issue/execution core architecture may implement the pipeline 1600 as follows: 1) the instruction fetch 1638 performs the fetch and length decoding stages 1602 and 1604; 2) the decode unit 1640 performs the decode stage 1606; 3) the rename/allocator unit 1652 performs the allocation stage 1608 and renaming stage 1610; 4) the scheduler unit(s) 1656 performs the schedule stage 1612; 5) the physical register file(s) unit(s) 1658 and the memory unit 1670 perform the register read/memory read stage 1614; the execution cluster 1660 perform the execute stage 1616; 6) the memory unit 1670 and the physical register file(s) unit(s) 1658 perform the write back/memory write stage 1618; 7) various units may be involved in the exception handling stage 1622; and 8) the retirement unit 1654 and the physical register file(s) unit(s) 1658 perform the commit stage 1624.

The core 1690 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1690 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1634/1674 and a shared L2 cache unit 1676, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 17B:
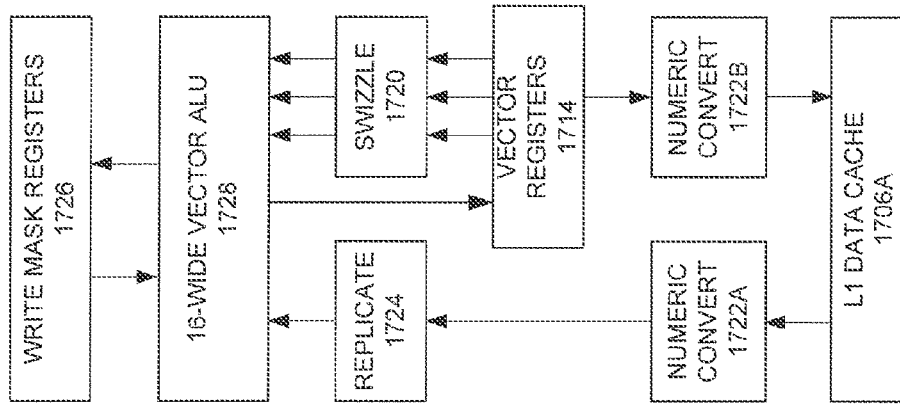
FIG. 17B is an expanded view of part of the processor core in FIG. 17A according to embodiments of the invention.
Figure 17A:
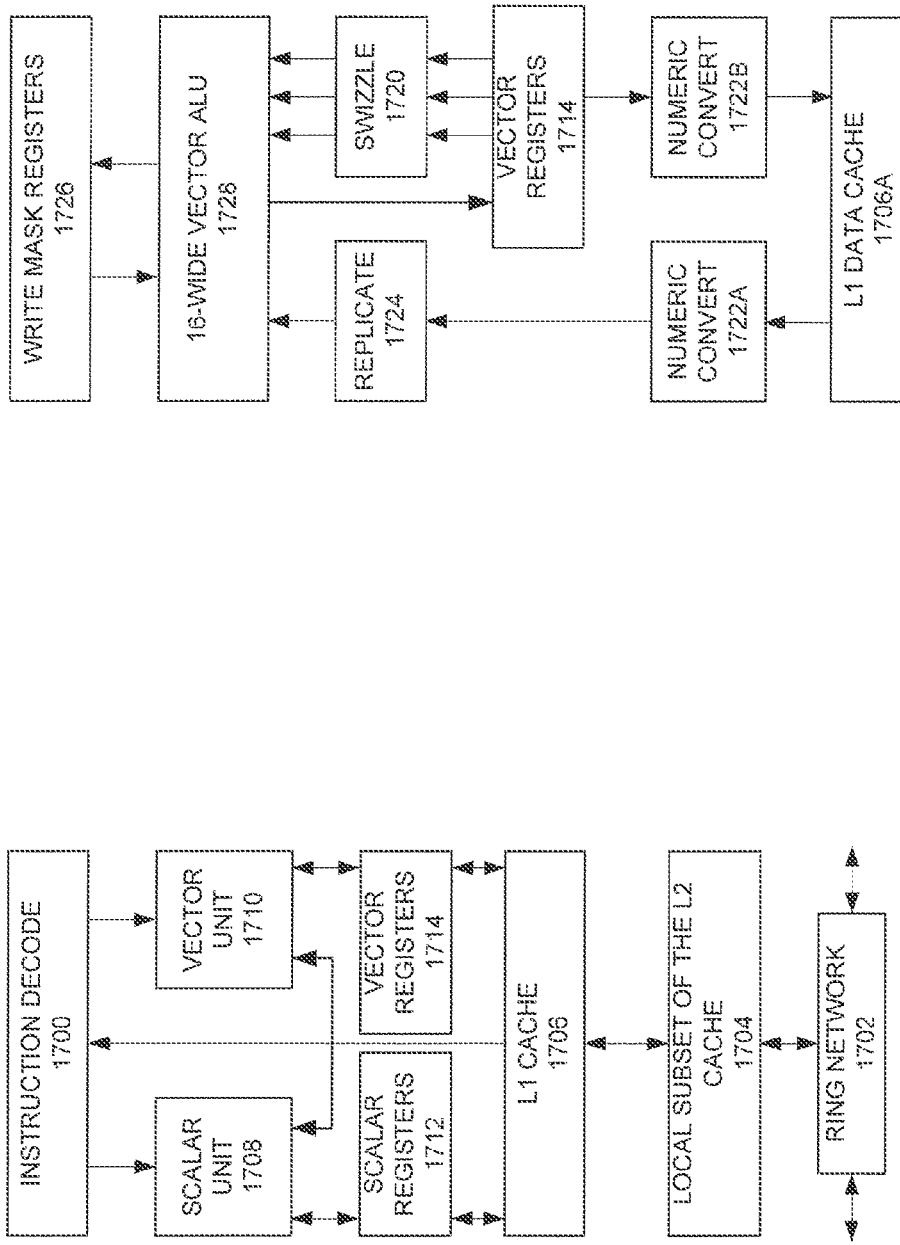
FIG. 17A is a block diagram of a single processor core, along with its connection to the on-die interconnect network and with its local subset of the Level 2 (L2) cache, according to embodiments of the invention.

FIGS. 17A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 17A is a block diagram of a single processor core, along with its connection to the on-die interconnect network 1702 and with its local subset of the Level 2 (L2) cache 1704, according to embodiments of the invention. In one embodiment, an instruction decoder 1700 supports the x86 instruction set with a packed data instruction set extension. An L1 cache 1706 allows low-latency accesses to cache memory into the scalar and vector units. While in one embodiment (to simplify the design), a scalar unit 1708 and a vector unit 1710 use separate register sets (respectively, scalar registers 1712 and vector registers 1714) and data transferred between them is written to memory and then read back in from a level 1 (L1) cache 1706, alternative embodiments of the invention may use a different approach (e.g., use a single register set or include a communication path that allow data to be transferred between the two register files without being written and read back).

The local subset of the L2 cache 1704 is part of a global L2 cache that is divided into separate local subsets, one per processor core. Each processor core has a direct access path to its own local subset of the L2 cache 1704. Data read by a processor core is stored in its L2 cache subset 1704 and can be accessed quickly, in parallel with other processor cores accessing their own local L2 cache subsets. Data written by a processor core is stored in its own L2 cache subset 1704 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 17B is an expanded view of part of the processor core in FIG. 17A according to embodiments of the invention. FIG. 17B includes an L1 data cache 1706A part of the L1 cache 1704, as well as more detail regarding the vector unit 1710 and the vector registers 1714. Specifically, the vector unit 1710 is a 16-wide vector processing unit (VPU) (see the 16-wide ALU 1728), which executes one or more of integer, single-precision float, and double-precision float instructions. The VPU supports swizzling the register inputs with swizzle unit 1720, numeric conversion with numeric convert units 1722A-B, and replication with replication unit 1724 on the memory input. Write mask registers 1726 allow predicating resulting vector writes.

Processor with Integrated Memory Controller and Graphics

Figure 18:
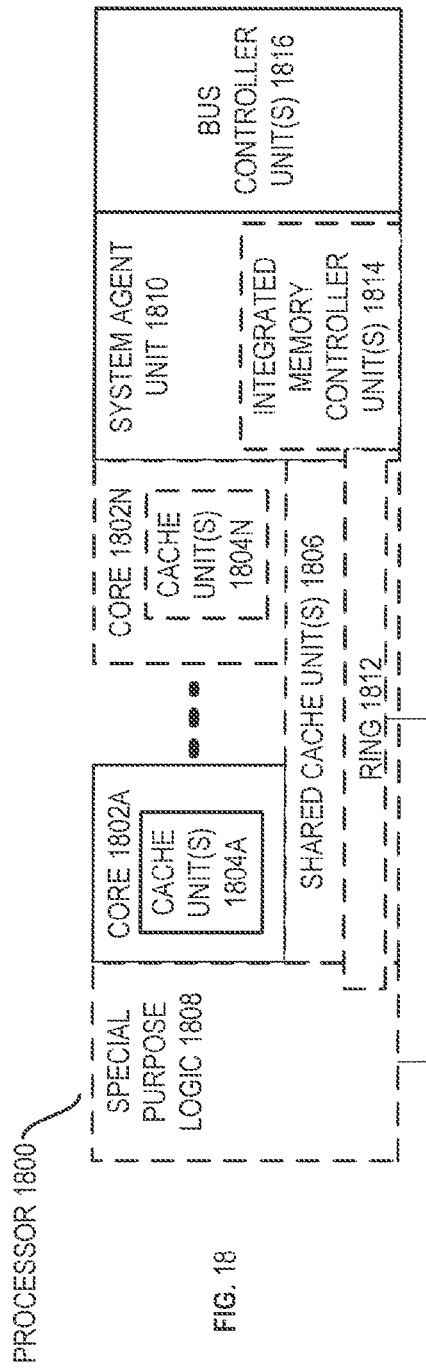
FIG. 18 is a block diagram of a processor that may have more than one core, may have an integrated memory controller, and may have integrated graphics according to embodiments of the invention.

FIG. 18 is a block diagram of a processor 1800 that may have more than one core, may have an integrated memory controller, and may have integrated graphics according to embodiments of the invention. The solid lined boxes in FIG. 18 illustrate a processor 1800 with a single core 1802A, a system agent 1810, a set of one or more bus controller units 1816, while the optional addition of the dashed lined boxes illustrates an alternative processor 1800 with multiple cores 1802A-N, a set of one or more integrated memory controller unit(s) 1814 in the system agent unit 1810, and special purpose logic 1808.

Thus, different implementations of the processor 1800 may include: 1) a CPU with the special purpose logic 1808 being integrated graphics and/or scientific (throughput) logic (which may include one or more cores), and the cores 1802A-N being one or more general purpose cores (e.g., general purpose in-order cores, general purpose out-of-order cores, a combination of the two); 2) a coprocessor with the cores 1802A-N being a large number of special purpose cores intended primarily for graphics and/or scientific (throughput); and 3) a coprocessor with the cores 1802A-N being a large number of general purpose in-order cores. Thus, the processor 1800 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1800 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1806, and external memory (not shown) coupled to the set of integrated memory controller units 1814. The set of shared cache units 1806 may include one or more mid-level caches, such as level 2 (L2), level 3 (L3), level 4 (L4), or other levels of cache, a last level cache (LLC), and/or combinations thereof. While in one embodiment a ring based interconnect unit 1812 interconnects the integrated graphics logic 1808, the set of shared cache units 1806, and the system agent unit 1810/integrated memory controller unit(s) 1814, alternative embodiments may use any number of well-known techniques for interconnecting such units. In one embodiment, coherency is maintained between one or more cache units 1806 and cores 1802-A-N.

In some embodiments, one or more of the cores 1802A-N are capable of multi-threading. The system agent 1810 includes those components coordinating and operating cores 1802A-N. The system agent unit 1810 may include for example a power control unit (PCU) and a display unit. The PCU may be or include logic and components needed for regulating the power state of the cores 1802A-N and the integrated graphics logic 1808. The display unit is for driving one or more externally connected displays.

The cores 1802A-N may be homogenous or heterogeneous in terms of architecture instruction set; that is, two or more of the cores 1802A-N may be capable of execution the same instruction set, while others may be capable of executing only a subset of that instruction set or a different instruction set.

Exemplary Computer Architectures

FIGS. 19-22 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 19:
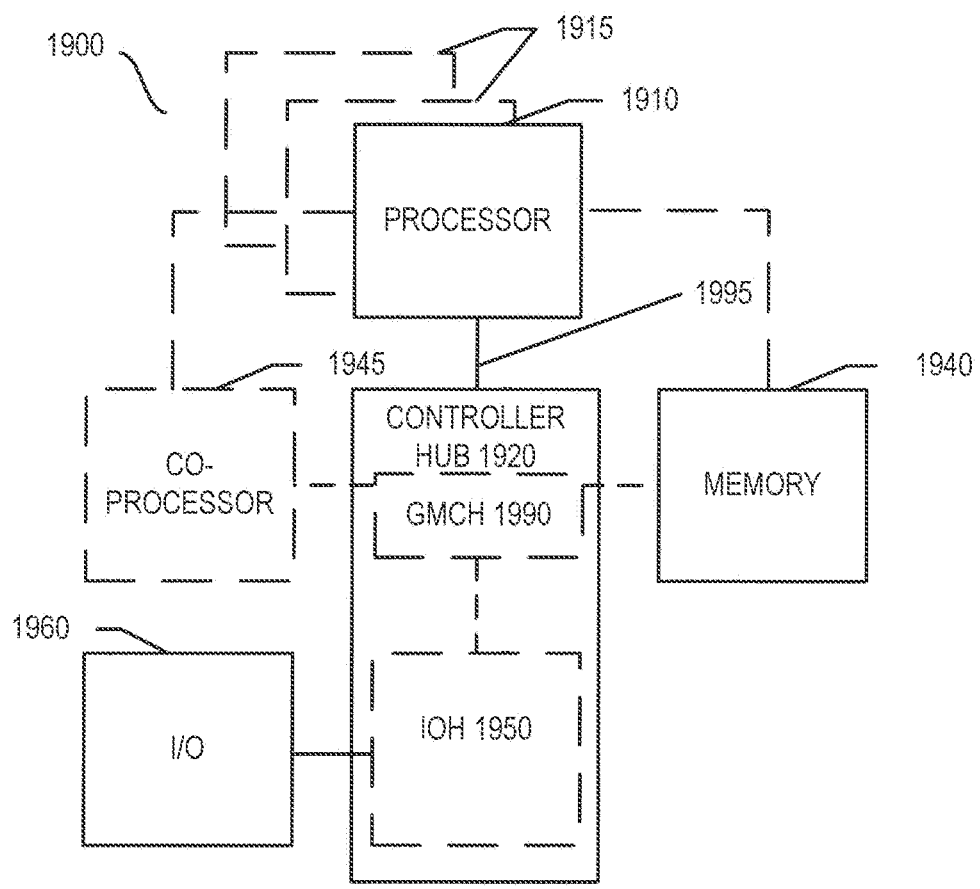
FIG. 19 shown is a block diagram of a system in accordance with one embodiment of the present invention.

Referring now to FIG. 19, shown is a block diagram of a system 1900 in accordance with one embodiment of the present invention. The system 1900 may include one or more processors 1910, 1915, which are coupled to a controller hub 1920. In one embodiment the controller hub 1920 includes a graphics memory controller hub (GMCH) 1990 and an Input/Output Hub (IOH) 1950 (which may be on separate chips); the GMCH 1990 includes memory and graphics controllers to which are coupled memory 1940 and a coprocessor 1945; the IOH 1950 is couples input/output (I/O) devices 1960 to the GMCH 1990. Alternatively, one or both of the memory and graphics controllers are integrated within the processor (as described herein), the memory 1940 and the coprocessor 1945 are coupled directly to the processor 1910, and the controller hub 1920 in a single chip with the IOH 1950.

The optional nature of additional processors 1915 is denoted in FIG. 19 with broken lines. Each processor 1910, 1915 may include one or more of the processing cores described herein and may be some version of the processor 1800.

The memory 1940 may be, for example, dynamic random access memory (DRAM), phase change memory (PCM), or a combination of the two. For at least one embodiment, the controller hub 1920 communicates with the processor(s) 1910, 1915 via a multi-drop bus, such as a frontside bus (FSB), point-to-point interface such as QuickPath Interconnect (QPI), or similar connection 1995.

In one embodiment, the coprocessor 1945 is a special-purpose processor, such as, for example, a high-throughput MIC processor, a network or communication processor, compression engine, graphics processor, GPGPU, embedded processor, or the like. In one embodiment, controller hub 1920 may include an integrated graphics accelerator.

There can be a variety of differences between the physical resources 1910, 1915 in terms of a spectrum of metrics of merit including architectural, microarchitectural, thermal, power consumption characteristics, and the like.

In one embodiment, the processor 1910 executes instructions that control data processing operations of a general type. Embedded within the instructions may be coprocessor instructions. The processor 1910 recognizes these coprocessor instructions as being of a type that should be executed by the attached coprocessor 1945. Accordingly, the processor 1910 issues these coprocessor instructions (or control signals representing coprocessor instructions) on a coprocessor bus or other interconnect, to coprocessor 1945. Coprocessor(s) 1945 accept and execute the received coprocessor instructions.

Figure 20:
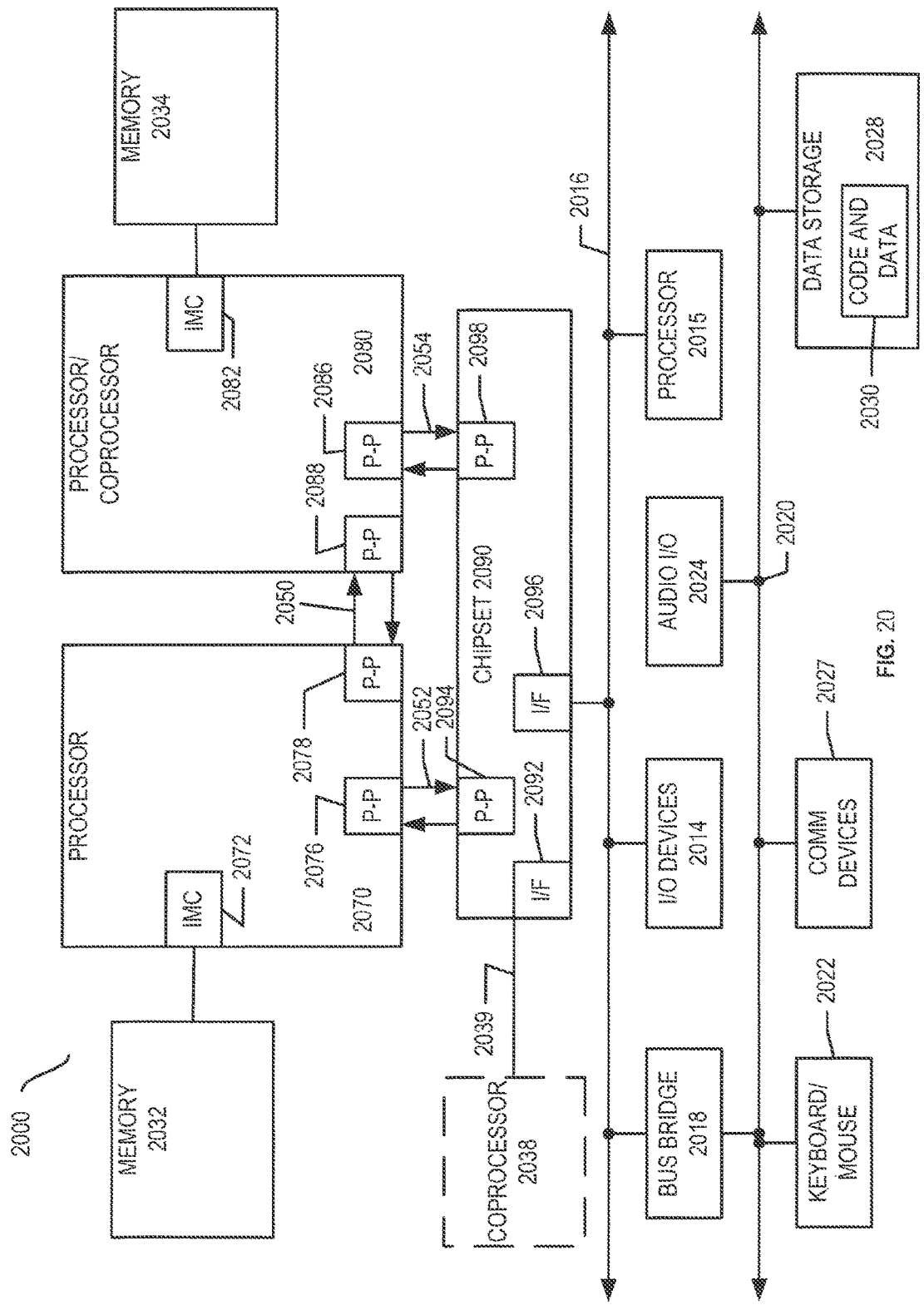
FIG. 20 shown is a block diagram of a first more specific exemplary system in accordance with an embodiment of the present invention.

Referring now to FIG. 20, shown is a block diagram of a first more specific exemplary system 2000 in accordance with an embodiment of the present invention. As shown in FIG. 20, multiprocessor system 2000 is a point-to-point interconnect system, and includes a first processor 2070 and a second processor 2080 coupled via a point-to-point interconnect 2050. Each of processors 2070 and 2080 may be some version of the processor 1800. In one embodiment of the invention, processors 2070 and 2080 are respectively processors 1910 and 1915, while coprocessor 2038 is coprocessor 1945. In another embodiment, processors 2070 and 2080 are respectively processor 1910 coprocessor 1945.

Processors 2070 and 2080 are shown including integrated memory controller (IMC) units 2072 and 2082, respectively. Processor 2070 also includes as part of its bus controller units point-to-point (P-P) interfaces 2076 and 2078; similarly, second processor 2080 includes P-P interfaces 2086 and 2088. Processors 2070, 2080 may exchange information via a point-to-point (P-P) interface 2050 using P-P interface circuits 2078, 2088. As shown in FIG. 20, IMCs 2072 and 2082 couple the processors to respective memories, namely a memory 2032 and a memory 2034, which may be portions of main memory locally attached to the respective processors.

Processors 2070, 2080 may each exchange information with a chipset 2090 via individual P-P interfaces 2052, 2054 using point to point interface circuits 2076, 2094, 2086, 2098. Chipset 2090 may optionally exchange information with the coprocessor 2038 via a high-performance interface 2039. In one embodiment, the coprocessor 2038 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 2090 may be coupled to a first bus 2016 via an interface 2096. In one embodiment, first bus 2016 may be a Peripheral Component Interconnect (PCI) bus, or a bus such as a PCI Express bus or another third generation I/O interconnect bus, although the scope of the present invention is not so limited.

As shown in FIG. 20, various I/O devices 2014 may be coupled to first bus 2016, along with a bus bridge 2018 which couples first bus 2016 to a second bus 2020. In one embodiment, one or more additional processor(s) 2015, such as coprocessors, high-throughput MIC processors, GPGPU's, accelerators (such as, e.g., graphics accelerators or digital signal processing (DSP) units), field programmable gate arrays, or any other processor, are coupled to first bus 2016. In one embodiment, second bus 2020 may be a low pin count (LPC) bus. Various devices may be coupled to a second bus 2020 including, for example, a keyboard and/or mouse 2022, communication devices 2027 and a storage unit 2028 such as a disk drive or other mass storage device which may include instructions/code and data 2030, in one embodiment. Further, an audio I/O 2024 may be coupled to the second bus 2020. Note that other architectures are possible. For example, instead of the point-to-point architecture of FIG. 20, a system may implement a multi-drop bus or other such architecture.

Figure 21:
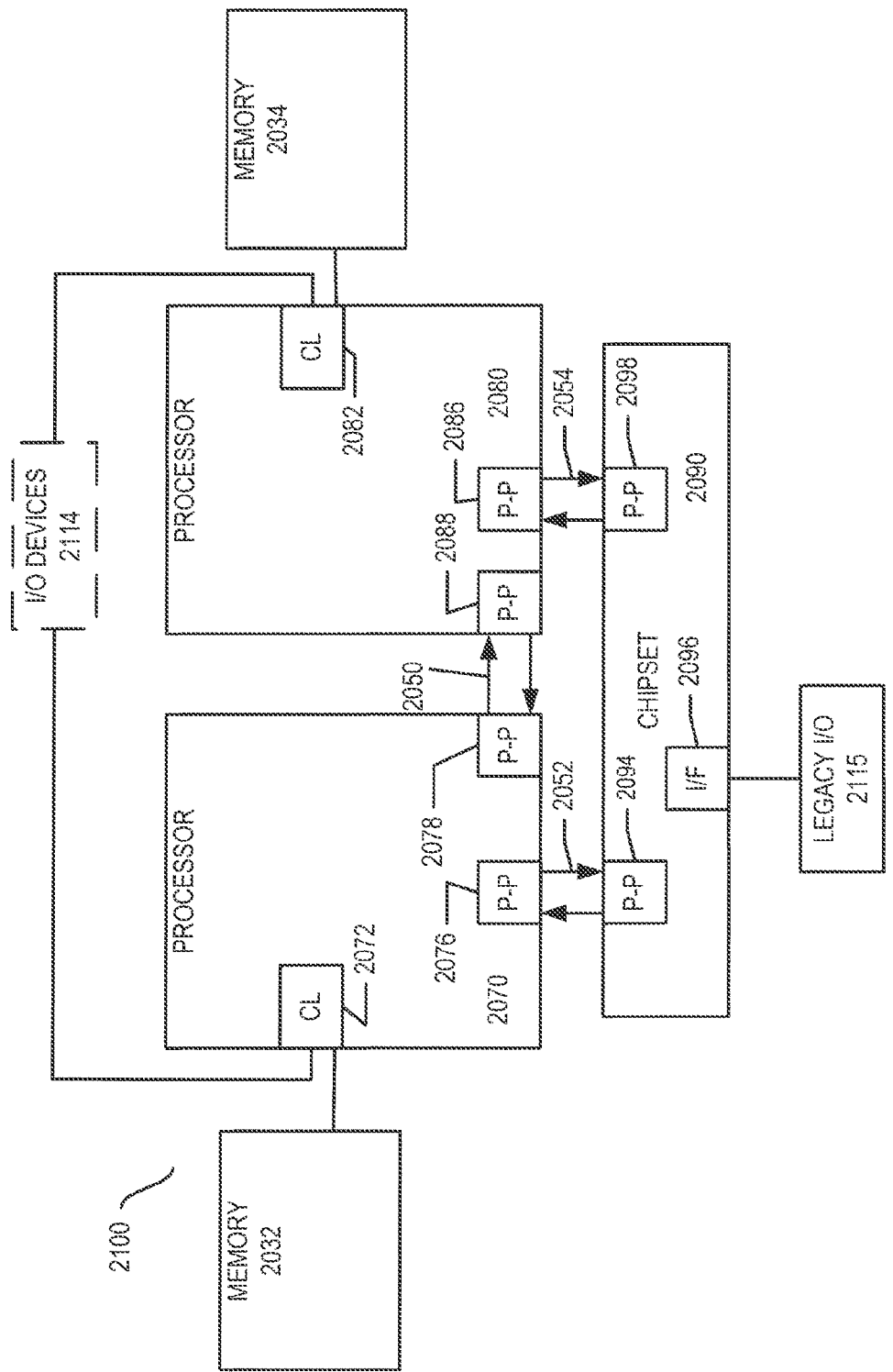
FIG. 21, shown is a block diagram of a second more specific exemplary system in accordance with an embodiment of the present invention.

Referring now to FIG. 21, shown is a block diagram of a second more specific exemplary system 2100 in accordance with an embodiment of the present invention. Like elements in FIGS. 20 and 21 bear like reference numerals, and certain aspects of FIG. 20 have been omitted from FIG. 21 in order to avoid obscuring other aspects of FIG. 21.

FIG. 21 illustrates that the processors 2070, 2080 may include integrated memory and I/O control logic ("CL") 2072 and 2082, respectively. Thus, the CL 2072, 2082 include integrated memory controller units and include I/O control logic. FIG. 21 illustrates that not only are the memories 2032, 2034 coupled to the CL 2072, 2082, but also that I/O devices 2114 are also coupled to the control logic 2072, 2082. Legacy I/O devices 2115 are coupled to the chipset 2090.

Figure 22:
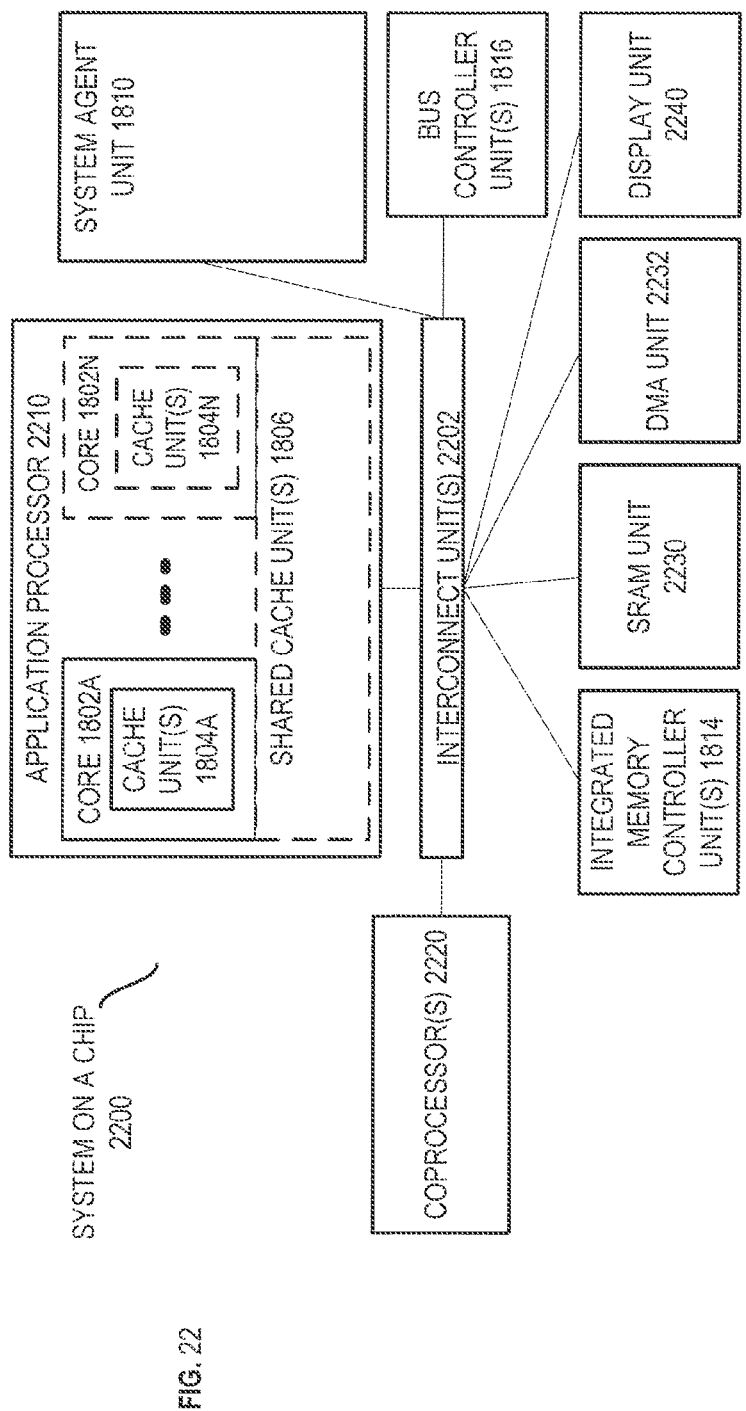
FIG. 22, shown is a block diagram of a SoC in accordance with an embodiment of the present invention.

Referring now to FIG. 22, shown is a block diagram of a SoC 2200 in accordance with an embodiment of the present invention. Similar elements in FIG. 18 bear like reference numerals. Also, dashed lined boxes are optional features on more advanced SoCs. In FIG. 22, an interconnect unit(s) 2202 is coupled to: an application processor 2210 which includes a set of one or more cores 202A-N and shared cache unit(s) 1806; a system agent unit 1810; a bus controller unit(s) 1816; an integrated memory controller unit(s) 1814; a set or one or more coprocessors 2220 which may include integrated graphics logic, an image processor, an audio processor, and a video processor; an static random access memory (SRAM) unit 2230; a direct memory access (DMA) unit 2232; and a display unit 2240 for coupling to one or more external displays. In one embodiment, the coprocessor(s) 2220 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 2030 illustrated in FIG. 20, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 23 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 23 shows a program in a high level language 2302 may be compiled using an x86 compiler 2304 to generate x86 binary code 2306 that may be natively executed by a processor with at least one x86 instruction set core 2316. The processor with at least one x86 instruction set core 2316 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2304 represents a compiler that is operable to generate x86 binary code 2306 (e.g., object code) that can, with or without additional linkage processing, be executed on the processor with at least one x86 instruction set core 2316. Similarly, FIG. 23 shows the program in the high level language 2302 may be compiled using an alternative instruction set compiler 2308 to generate alternative instruction set binary code 2310 that may be natively executed by a processor without at least one x86 instruction set core 2314 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2312 is used to convert the x86 binary code 2306 into code that may be natively executed by the processor without an x86 instruction set core 2314. This converted code is not likely to be the same as the alternative instruction set binary code 2310 because an instruction converter capable of this is difficult to make; however, the converted code will accomplish the general operation and be made up of instructions from the alternative instruction set. Thus, the instruction converter 2312 represents software, firmware, hardware, or a combination thereof that, through emulation, simulation or any other process, allows a processor or other electronic device that does not have an x86 instruction set processor or core to execute the x86 binary code 2306.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. For example, an execution unit may be coupled with a register through one or more intervening components.

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. In other instances, well-known circuits, structures, devices, and operations have been shown in block diagram form or without detail in order to avoid obscuring the understanding of the description.

It will also be appreciated, by one skilled in the art, that modifications may be made to the embodiments disclosed herein, such as, for example, to the configurations, forms, functions, and manner of operation and use, of the components of the embodiments. All equivalent relationships to those illustrated in the drawings and described in the specification are encompassed within embodiments of the invention. For simplicity and clarity of illustration, elements illustrated in the figures have not necessarily been drawn to scale. For example, the dimensions of some of the elements may have been exaggerated relative to other elements for clarity. In the figures, arrows are used to show couplings.

Various operations and methods have been described. Some of the methods have been described in a basic form in the flow diagrams, but operations may optionally be added to and/or removed from the methods. In addition, a particular order of the operations may have been described, according to example embodiments, it is to be understood that that particular order is exemplary. Alternate embodiments may optionally perform the operations in different order, combine certain operations, overlap certain operations, etc. Many modifications and adaptations may be made to the methods described and are contemplated.

Certain operations may be performed by hardware components, or may be embodied in machine-executable or circuit-executable instructions, that may be used to cause, or at least result in, a circuit or hardware programmed with the instructions performing the operations. The circuit may include a general-purpose or special-purpose processor, or logic circuit, to name just a few examples. The operations may also optionally be performed by a combination of hardware and software. An execution unit and/or a processor may include specific or particular circuitry or other logic responsive to instructions, microinstructions, or one or more control signals, derived from a machine instruction to perform certain operations.

It should also be appreciated that reference throughout this specification to "one embodiment", "an embodiment", or "one or more embodiments", for example, means that a particular feature may be included in the practice of the invention. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

What is claimed is:

1. A processor comprising:
   a set of packed data registers;
   a set of general-purpose registers;
   a set of packed data operation mask registers;
   a decode unit to decode an instruction that is to specify a first packed data operation mask register of the set of packed data operation mask registers, that is to specify a second packed data operation mask register of the set of packed data operation mask registers, and that is to specify a third packed data operation mask register of the set of packed data operation mask registers, the first packed data operation mask register to store a first 8-bit packed data operation mask in bits [7:0], and the second packed data operation mask register to store a second 8-bit packed data operation mask in bits [7:0]; and
   an execution unit coupled with the decode unit, and coupled with the set of packed data operation mask registers, the execution unit, in response to the decode of the instruction, to store a result in the third packed data operation mask register, the result to include the first 8-bit packed data operation mask in bits [7:0] of the third packed data operation mask register, the second 8-bit packed data operation mask in bits [15:8] of the third packed data operation mask register, and zeroes in all bits of the third packed data operation mask register more significant than bit [15] of the third packed data operation mask register, including zeroes in at least bits [31:16] of the third packed data operation mask register.

2. The processor of claim 1, wherein the third packed data operation mask register comprises 64-bits, and wherein the execution unit, in response to the decode of the instruction, is to store zeroes in bits [63:16] of the third packed data operation mask register.

3. The processor of claim 2, wherein the decode unit is to decode the instruction that has a first field to specify the first packed data operation mask register, that has a second field to specify the second packed data operation mask register, and that has a third field to specify the third packed data operation mask register.

4. The processor of claim 3, wherein an 8-bit size of the first 8-bit packed data operation mask is implicit to an opcode of the instruction.

5. The processor of claim 3, wherein the set of packed data operation mask registers is a set of eight packed data operation mask registers.

6. The processor of claim 3, wherein the execution unit, in response to the decode of the instruction, is to store the result in which bits of the first 8-bit packed data operation mask are to be in a same order as in the first packed data operation mask register, and in which bits of the second 8-bit packed data operation mask are to be in a same order as in the second packed data operation mask register.

7. The processor of claim 3, wherein each bit of the first 8-bit packed data operation mask is to correspond to a different data element of a packed data.

8. A processor comprising:
   a set of packed data registers;
   a set of general-purpose registers;
   a set of packed data operation mask registers;
   a decode unit to decode an instruction that is to specify a first packed data operation mask register of the set of packed data operation mask registers, that is to specify a second packed data operation mask register of the set of packed data operation mask registers, and that is to specify a third packed data operation mask register of the set of packed data operation mask registers, the first packed data operation mask register to store a first 16-bit packed data operation mask in bits [15:0], and the second packed data operation mask register to store a second 16-bit packed data operation mask in bits [15:0]; and
   an execution unit coupled with the decode unit, and coupled with the set of packed data operation mask registers, the execution unit, in response to the decode of the instruction, to store a result in the third packed data operation mask register, the result to include the first 16-bit packed data operation mask in bits [15:0] of the third packed data operation mask register, the second 16-bit packed data operation mask in bits [31:16] of the third packed data operation mask register, and zeroes in all bits of the third packed data operation mask register more significant than bit [31] of the third packed data operation mask register, including zeroes in at least bits [63:32] of the third packed data operation mask register.

9. The processor of claim 8, wherein a 16-bit size of the first 16-bit packed data operation mask is implicit to an opcode of the instruction.

10. The processor of claim 9, wherein the decode unit is to decode the instruction that has a first field to specify the first packed data operation mask register, that has a second field to specify the second packed data operation mask register, and that has a third field to specify the third packed data operation mask register.

11. The processor of claim 10, wherein the set of packed data operation mask registers is a set of eight packed data operation mask registers.

12. The processor of claim 10, wherein the third packed data operation mask register consists of 64-bits.

13. The processor of claim 10, wherein the execution unit, in response to the decode of the instruction, is to store the result in which bits of the first 16-bit packed data operation mask are to be in a same order as in the first packed data operation mask register, and in which bits of the second 16-bit packed data operation mask are to be in a same order as in the second packed data operation mask register.

14. The processor of claim 10, wherein each bit of the first 16-bit packed data operation mask is to correspond to a different data element of a packed data.

15. A processor comprising:
a plurality of packed data registers each able to store at least 512-bits;
a plurality of general-purpose registers;
a plurality of packed data operation mask registers, wherein instructions of an instruction set of the processor are to specify packed data operation mask registers of the plurality of packed data operation mask registers to identify predicate operands to be used for predication;
a decode unit to decode an instruction that is to specify a first packed data operation mask register of the plurality of packed data operation mask registers, that is to specify a second packed data operation mask register of the plurality of packed data operation mask registers, and that is to specify a third packed data operation mask register of the plurality of packed data operation mask registers, the first packed data operation mask register to store a first 16-bit packed data operation mask in bits [15:0], and the second packed data operation mask register to store a second 16-bit packed data operation mask in bits [15:0], wherein the first 16-bit packed data operation mask being 16-bits in size is implicit to an opcode of the instruction; and
an execution unit coupled with the decode unit, and coupled with the plurality of packed data operation mask registers, the execution unit, in response to the decode of the instruction, to store a result in the third packed data operation mask register, the result to include the first 16-bit packed data operation mask in bits [15:0] of the third packed data operation mask register in which bits of the first 16-bit packed data operation mask are to be in a same order in the result as they appear in the first packed data operation mask register, the second 16-bit packed data operation mask in bits [31:16] of the third packed data operation mask register in which bits of the second 16-bit packed data operation mask are to be in a same order in the result as they appear in the second packed data operation mask register, and zeroes in all bits of the third packed data operation mask register more significant than bit [31] of the third packed data operation mask register, including zeroes in at least bits [63:32] of the third packed data operation mask register.

16. An apparatus comprising:
an instruction converter to convert a first instruction of a first instruction set to a set of one or more corresponding instructions of a second different instruction set, the first instruction to specify a first 16-bit packed data operation mask and to specify a second 16-bit packed data operation mask; and
a processor coupled with the instruction converter, the processor including a plurality of packed data registers, a plurality of general-purpose registers, a decode unit to decode each of the set of the one or more corresponding instructions of the second different instruction set, and the processor including one or more execution units to perform the set of the one or more corresponding instructions of the second different instruction set, the processor, due to the performance of the set of the one or more corresponding instructions of the second different instruction set, to store a result in a destination storage location of the processor, the result to include the first 16-bit packed data operation mask in bits [15:0] of the destination storage location, the second 16-bit packed data operation mask in bits [31:16] of the destination storage location, and zeroes in all bits of the destination storage location more significant than bit [31] of the destination storage location.

17. The apparatus of claim 16, wherein it is implicit to an opcode of the first instruction that the first 16-bit packed data operation mask has a 16-bit size.

18. The apparatus of claim 17, wherein the first instruction has a first set of three bits to specify the first 16-bit packed data operation mask, and has a second set of three bits to specify the second 16-bit packed data operation mask.

19. The apparatus of claim 18, wherein the result is to include zeroes in bits [63:16] of the destination storage location.

20. The apparatus of claim 18, wherein each bit of the first 16-bit packed data operation mask is to correspond to a different data element of a packed data, and wherein the first instruction is to have an instruction format that includes a three-byte VEX Prefix.

21. An apparatus comprising:
an instruction converter to convert a first instruction of a first instruction set to a set of one or more corresponding instructions of a second different instruction set, the first instruction to have a first set of three bits to specify a first storage location that is to have a first 16-bit packed data operation mask and to have a second set of three bits to specify a second storage location that is to have a second 16-bit packed data operation mask, wherein the first 16-bit packed data operation mask having a size of 16-bits is implicit to an opcode of the first instruction; and
a processor coupled with the instruction converter, the processor including a plurality of packed data registers, a plurality of general-purpose registers, a decode unit to decode each of the set of the one or more corresponding instructions of the second different instruction set, and the processor including one or more execution units to perform the set of the one or more corresponding instructions of the second different instruction set, the processor, due to the performance of the set of the one or more corresponding instructions of the second different instruction set, to store a result in a destination storage location of the processor, the result to include the first 16-bit packed data operation mask in bits [15:0] of the destination storage location in which bits of the first 16-bit packed data operation mask are to be in a same order in the destination storage location as they appear in the first storage location, the second 16-bit packed data operation mask in bits [31:16] of the destination storage location in which bits of the second 16-bit packed data operation mask are to be in a same order in the destination storage location as they appear in the second storage location, and zeroes in all bits of the destination storage location more significant than bit [31] of the destination storage location, including zeroes in at least bits [63:32] of the destination storage location.

* * * * *